(12) United States Patent
Naito

(10) Patent No.: US 7,504,934 B2
(45) Date of Patent: Mar. 17, 2009

(54) TIRE CONDITION INFORMATION COLLECTION APPARTUS AND RELAY APPARATUS THEREOF

(75) Inventor: Mitsuru Naito, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 502 days.

(21) Appl. No.: 10/555,425

(22) PCT Filed: Sep. 28, 2004

(86) PCT No.: PCT/JP2004/014148

§ 371 (c)(1),
(2), (4) Date: Oct. 28, 2005

(87) PCT Pub. No.: WO2005/032858

PCT Pub. Date: Apr. 14, 2005

(65) Prior Publication Data

US 2006/0250227 A1    Nov. 9, 2006

(30) Foreign Application Priority Data

Sep. 30, 2003    (JP)    ............................. 2003-340557

(51) Int. Cl.
*B60C 23/00*    (2006.01)
(52) U.S. Cl. ..................... 340/447; 340/438; 340/442; 340/445; 73/146
(58) Field of Classification Search ................. 340/438, 340/442, 445, 447; 73/146
See application file for complete search history.

(56) References Cited

U.S. PATENT DOCUMENTS 6,591,671 B2 *    7/2003    Brown ........................ 73/146.5
7,161,476 B2 *    1/2007    Hardman et al. ............ 340/442
2002/0003474 A1 *    1/2002    McClelland et al. ........ 340/442
2004/0099055 A1 *    5/2004    Komatsu et al. ............... 73/146
2006/0193368 A1 *    8/2006    Shepherd et al. ............ 374/100

FOREIGN PATENT DOCUMENTS

| JP | 03-104715 | 5/1991 |
| JP | 11-240315 | 9/1999 |

(Continued)

*Primary Examiner*—Benjamin C Lee
*Assistant Examiner*—Samuel J Walk
(74) *Attorney, Agent, or Firm*—Knobbe Martens Olson & Bear, LLP

(57) ABSTRACT

The invention provides a tire condition information collection apparatus and a relay apparatus thereof, which corrects a predetermined physical quantity within tire by use of a predetermined physical quantity outside tire in a vicinity of tire to inform of the corrected physical quantity.

An air pressure and temperature of tire are detected by a detection apparatus 10 provided in each wheel 2. The detection data is transmitted from the detection apparatus 10 to a relay apparatus 20 disposed in the vicinity of each wheel by electromagnetic wave of a first frequency. When receiving the transmitted data, the relay apparatus 20 detects an atmospheric pressure and temperature in the vicinity of the wheel 2, and transmits the data to a main apparatus 30 along with the detection data received from the detection apparatus 10. The main apparatus 30 corrects the detection data of the detection apparatus 10 by use of the detection data of the relay apparatus 20, and displays the information obtained by applying the correction on a display panel to inform the driver of the information.

18 Claims, 24 Drawing Sheets

FOREIGN PATENT DOCUMENTS

| | | |
|---|---|---|
| JP | 11-254926 | 9/1999 |
| JP | 2000-182164 | 6/2000 |
| JP | 2001-056263 | 2/2001 |
| JP | 2001-322411 | 11/2001 |
| JP | 2003-002019 | 1/2003 |
| JP | 2003-028151 | 1/2003 |
| JP | 2003-139155 | 5/2003 |
| JP | 2003-182324 | 7/2003 |
| JP | 2003-291615 | 10/2003 |

* cited by examiner

*Fig.* 23

TIRE CONDITION INFORMATION COLLECTION APPARTUS AND RELAY APPARATUS THEREOF

This application is the U.S. National Phase under 35 U.S.C. §371 of International Application PCT/JP2004/014148, filed Sep. 28, 2004, which claims priority to Japanese Patent Application No. 2003-340557, filed Sep. 30, 2003. The International Application was not published under PCT Article 21(2) in English.

TECHNICAL FIELD

The present invention relates to a tire condition information collection apparatus and a relay apparatus thereof, and more particularly to a tire condition information collection apparatus and a relay apparatus thereof, which corrects a predetermined physical quantity within tire by use of a predetermined physical quantity outside tire in a vicinity of tire, and informs of the result.

BACKGROUND ART

There have hitherto been known tire monitoring systems for acquiring information on tire conditions such as pressure, temperature, etc. of the atmosphere inside tire's air chamber.

As an exemplary technique of this type, systems for monitoring air pressure inside tire are disclosed in Japanese Patent Publication 2001-56263 (a first conventional example), Japanese Patent Publication 2000-182164 (a second conventional example), and so on.

The tire air pressure monitoring system of the first conventional example, provided in each tire of a vehicle, has a transmitter to transmit a tire air pressure signal for each tire outputted from an air pressure sensor, and multiple reception antennas extended to a neighborhood of each tire. The tire air pressure monitoring system includes a receiver to receive the tire air pressure signal from the transmitter, a display apparatus to inform the vehicle driver of air pressure condition of each tire, and a combining unit to output selectively the maximum voltage from among the voltages induced in each reception antenna. With this combining unit, the induction voltages of each reception antenna complement each other, and at the same time a selection is performed from among the receptions of each reception antenna. Thus the signal transmitted from the transmitter can be received in a stable manner.

Also, in the tire air pressure monitoring system of the second conventional example, a reception antenna is also provided within a receiver. Accordingly, the number of reception antennas extended to the vicinity of tire is reduced.

Meanwhile, an exemplary tire air pressure monitoring system in which reception antennas need not to be extended to a vicinity of tire is disclosed in Japanese Patent Publication 11-254926 (a third conventional example), Japanese Patent Publication 11-240315 (a fourth conventional example), and so on.

The third conventional example is a tire monitoring system which has a storage apparatus provided in an inner wall of tire within the air chamber of tire, and at the same time has a monitoring apparatus secured to a rim's inner wall face inside the air chamber of tire. In this system, the storage apparatus includes an antenna, a battery and an electronic chip; the monitoring apparatus includes a battery, an antenna, and a microchip connected to an amplifier. The battery of the monitoring apparatus is larger in capacity than that of the storage apparatus.

With the above described structure, in the system of the third conventional example, information on physical quantity within the tire's air chamber detected by the storage apparatus is transmitted by use of electromagnetic wave; the information is received by the monitoring apparatus. Also, the monitoring apparatus transmits the received information by use of electromagnetic wave having a larger output power than that of the storage apparatus. Accordingly, the power consumption of battery for the storage apparatus and monitoring apparatus can be reduced, thus enabling the continuous operation of the system without frequently exchanging the batteries.

In addition, in the third conventional example, the battery of the monitoring apparatus is separately disposed outside the tire's air chamber and connected to the monitoring apparatus via a connector provided by penetrating the rim, whereby the exchange of the battery of the monitoring apparatus is made easy.

In the fourth conventional example substantially similar to the third conventional example, information on physical quantity within the tire's air chamber detected by a tire tag is transmitted by use of electromagnetic wave; the information is received by a transponder. In addition, the transponder transmits the received information by use of electromagnetic wave having a larger output power than that of the tire tag. Accordingly, the power consumption of battery for the tire tag and transponder can be reduced, thus enabling the continuous operation of the system without frequently exchanging the batteries.

Patent document 1: Japanese Patent Publication 2001-56263
Patent document 2: Japanese Patent Publication 2000-182164
Patent document 3: Japanese Patent Publication 11-254926
Patent document 4: Japanese Patent Publication 11-240315

DISCLOSURE OF THE INVENTION

Problem to be Solbed by the Invention

However, when the above described physical quantity of tire, such as air pressure, is detected, the results of detection can be affected by a physical quantity outside tire. For example, when air pressure inside tire is monitored, even with the same tire, the tire's temperature varies depending on whether the tire is in the sunshine or in the shade; the difference in the tire's temperature also causes a difference in the air pressure inside tire. In addition, the air pressure outside tire varies according to the altitude of the vehicle's location. Thus, the differences in the results of detection can arise, thus making it impossible to obtain correct information.

To address the above described problems, an object of the present invention is to provide a tire condition information collection apparatus and a relay apparatus thereof, which corrects a predetermined physical quantity inside tire by a predetermined physical quantity outside tire in a vicinity of tire, and informs of the result.

Means for Solving the Problem

According to the present invention, there is provided a tire condition information collection apparatus for detecting a predetermined physical quantity of vehicle tire to inform a driver or an administrator of the information on tire condition, characterized mainly by comprising: a plurality of detection apparatuses mounted on each tire; a plurality of relay apparatuses disposed in a predetermined vehicle side position in a vicinity of each tire; and a main apparatus for informing the driver or administrator of a result of detection of the physical quantity of tire, wherein the detection apparatus includes: a sensor circuit which detects a predetermined first physical quantity within tire to output an electrical signal corresponding to the first physical quantity; and wireless communication means for wirelessly transmitting the result of detection as information within tire by use of electromagnetic wave of a first frequency based on the electrical signal outputted from the sensor circuit, and the relay apparatus includes: reception means for receiving the information within tire transmitted from the wireless communication means of the detection apparatus; outside-tire information detection means for detecting a predetermined second physical quantity outside tire in a vicinity of the self apparatus as information outside tire; and transmission means for wirelessly transmitting the information within tire and the information outside tire by use of electromagnetic wave of a second frequency, and the main apparatus includes: reception means for receiving the information within tire and the information outside tire transmitted from the relay apparatus; information correction means for correcting the first physical quantity based on the information within tire by use of the second physical quantity based on the information outside tire according to the received information within tire and information outside tire; and information informing means for informing of the information corrected by the information correction means as information on tire condition.

Effect of the Invention

With the tire condition information collection apparatus according to the present invention, it is possible to inform of the information obtained by correcting the detected first physical quantity, such as air pressure inside tire, by use of the detected second physical quantity, such as outside air pressure in the vicinity of tire, thus enabling provision of correct information for the driver or administrator.

Also, with the relay apparatus according to the present invention, the second physical quantity outside tire in the vicinity of tire can be detected, so that the information thereon can be supplied to the main apparatus along with the information on the first physical quantity detected by the detection apparatus. Accordingly, the above described condition collection apparatus can be easily constructed.

The above and other objects and the attendant advantages and features of the present invention will become readily apparent by reference to the following description when considered in conjunction with the accompanying drawings.

BRIEFLY DESCRIBE OF THE DRAWINGS

DESCRIPTION OF SYMBOLS

1 . . . vehicle, 2 . . . wheel, 10 . . . detection apparatus, 11 . . . sensor section, 12 . . . central processing section, 13 . . . transmission section, 14 . . . antenna, 15 . . . battery, 16 . . . antenna, 17 . . . reception section, 111 . . . pressure sensor, 112 . . . temperature sensor, 113, 114 . . . A/D converter circuit, 121 . . . CPU, 122 . . . storage section, 131 . . . transmitter, 132 . . . D/A converter circuit, 171 . . . receiver, 172 . . . A/D converter circuit, 20 . . . relay apparatus, 21 . . . sensor section, 22 . . . central processing section, 23 . . . reception section, 24 . . . transmission section, 25, 26 . . . antenna, 27 . . . battery, 211 . . . pressure sensor, 212 . . . temperature sensor, 213, 214 . . . A/D converter circuit, 221 . . . CPU, 222 . . . storage section, 231 . . . receiver, 232 . . . A/D converter circuit, 241 . . . transmitter, 242 . . . D/A converter circuit, 30 . . . main apparatus, 31 . . . antenna, 32 . . . reception section, 33 . . . central processing section, 34 . . . display section, 35 . . . antenna, 36 . . . transmission section, 321 . . . receiver, 322 . . . A/D converter circuit, 331 . . . CPU, 332 . . . storage section, 361 . . . transmitter, 362 . . . D/A converter circuit, 400 . . . display panel, 401a to 401d, 402a to 402d . . . LED, 403 . . . liquid crystal display unit

BEST MODE FOR CARRYING OUT THE INVENTION

An embodiment of the present invention will be described below with reference to the accompanying drawings.

Embodiment 1

Figure 1:
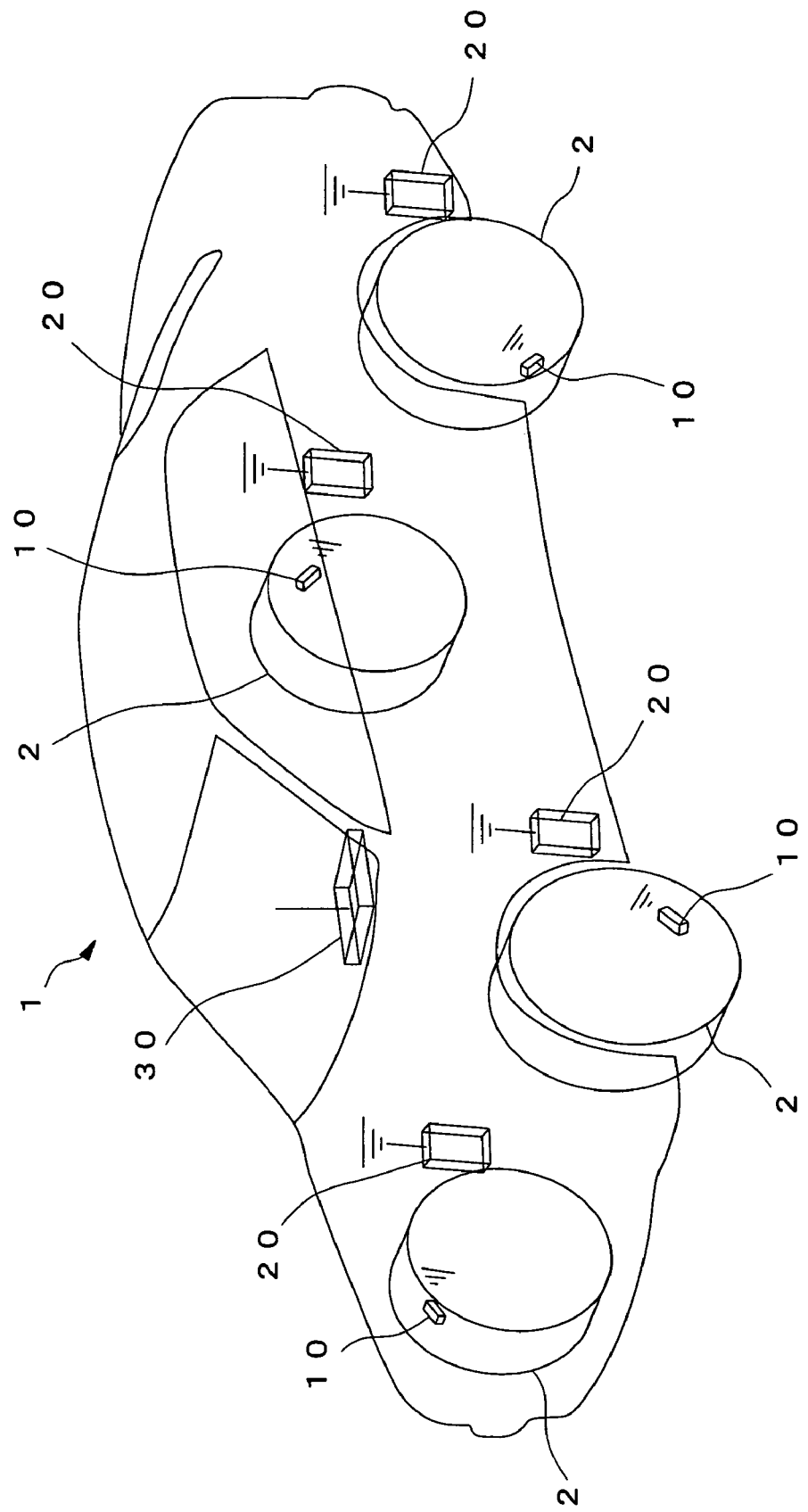
FIG. 1 is a diagram showing an overall structure of a tire condition information collection apparatus according to an embodiment 1 of the present invention.
Figure 2:
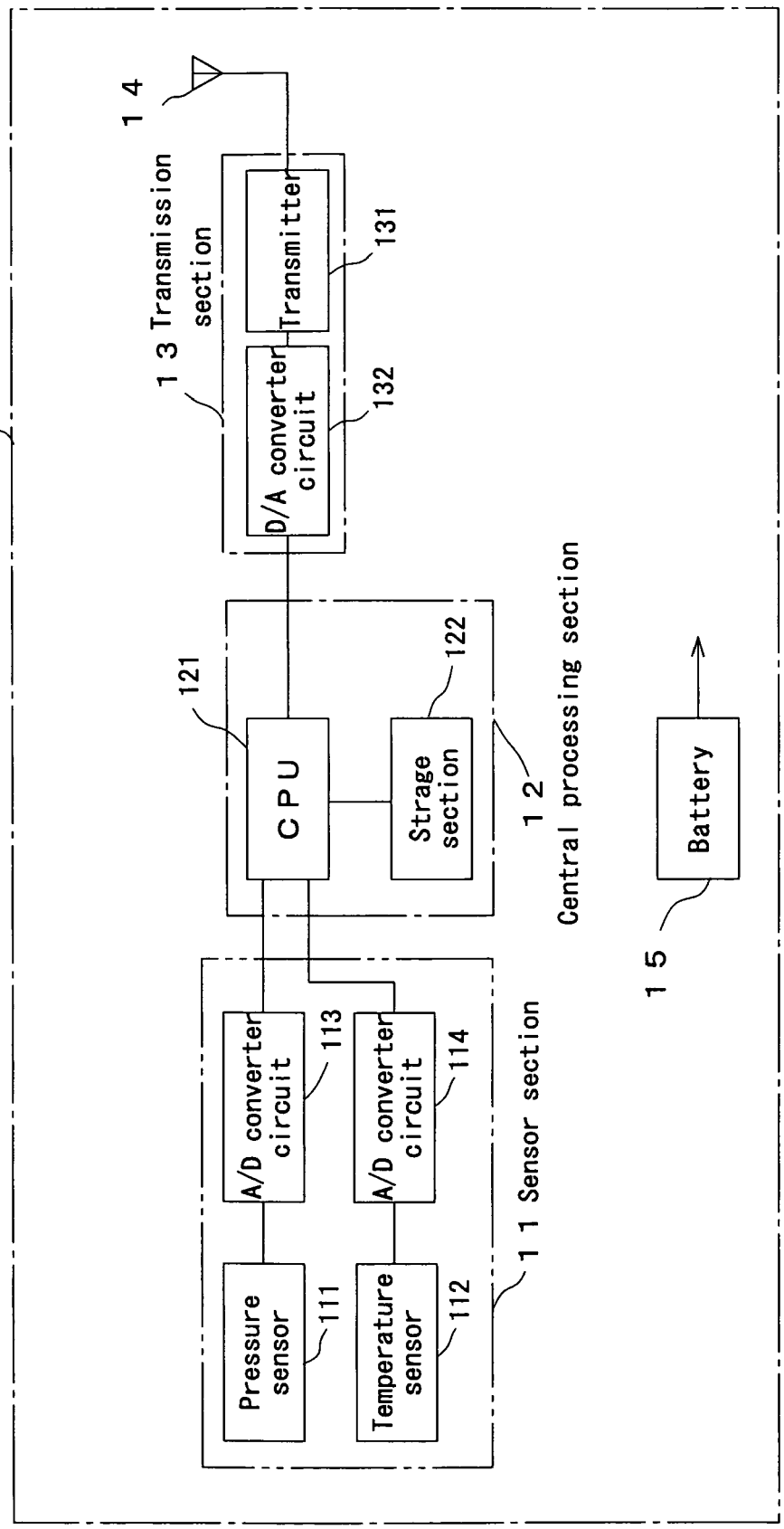
FIG. 2 is a block diagram showing an electrical circuit of a detection apparatus according to the embodiment 1 of the present invention.
Figure 3:
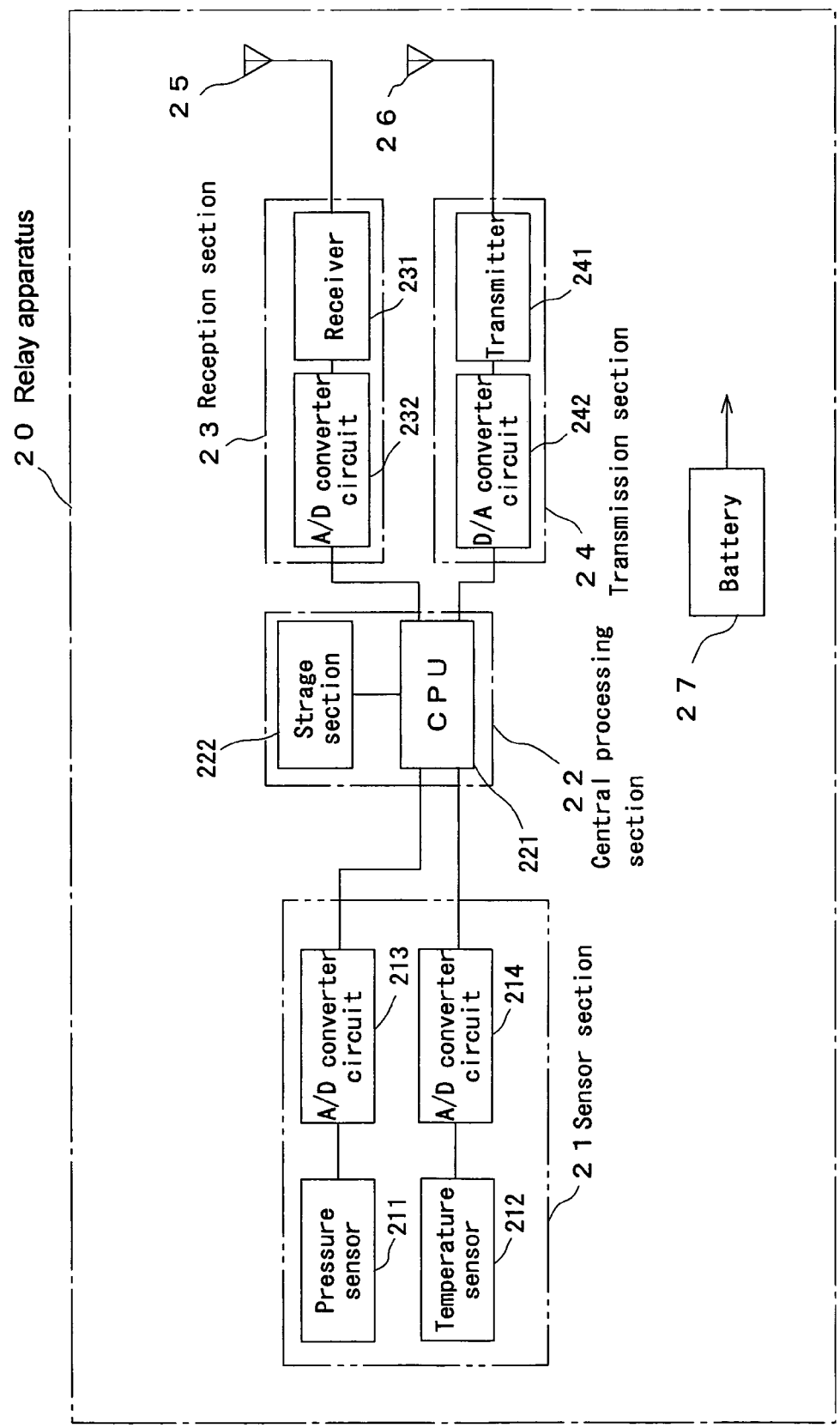
FIG. 3 is a block diagram showing an electrical circuit of a relay apparatus according to the embodiment 1 of the present invention.
Figure 4:
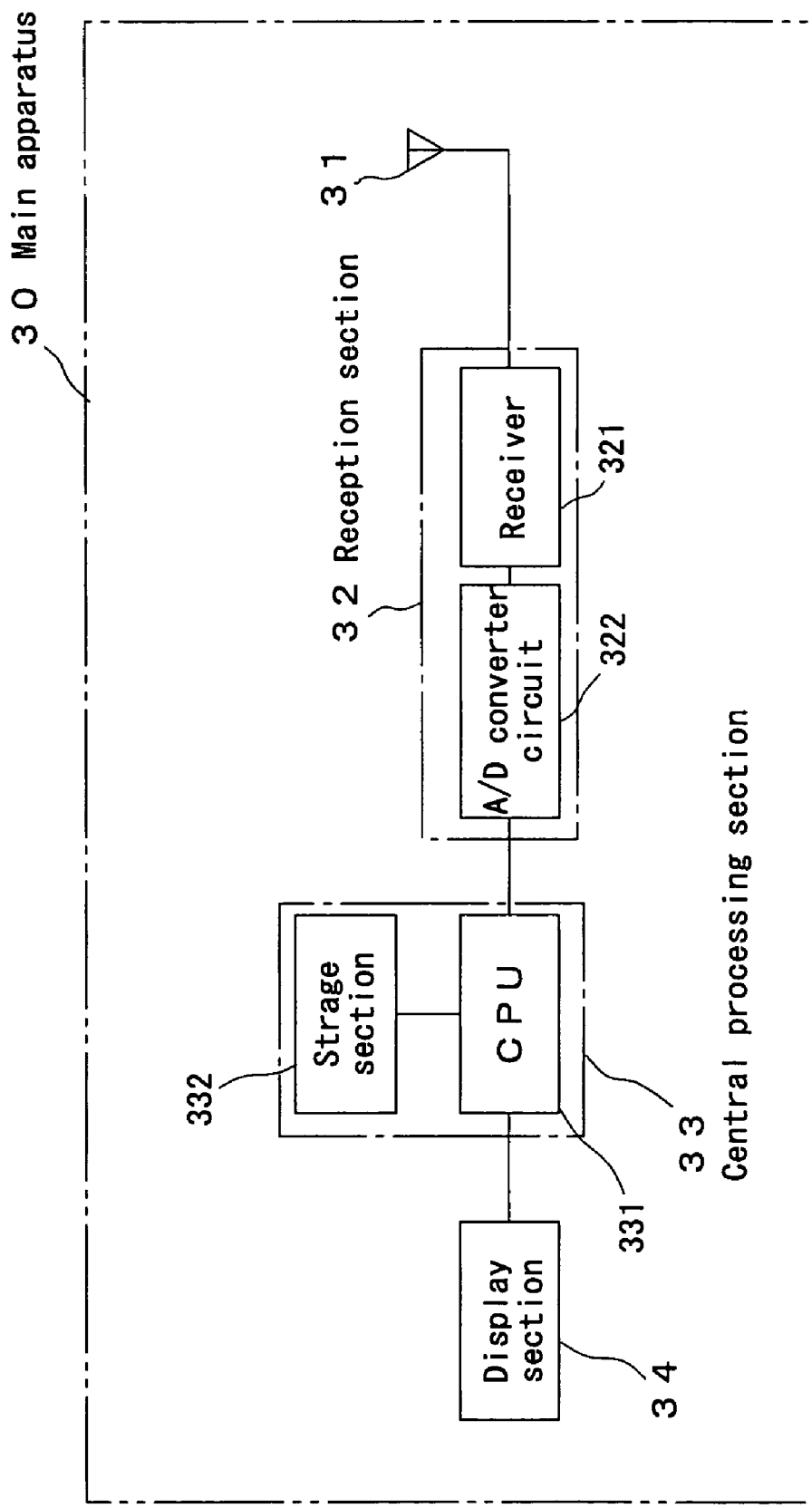
FIG. 4 is a block diagram showing an electrical circuit of a main apparatus according to the embodiment 1 of the present invention.

FIG. 1 is a diagram showing an overall structure of a tire condition information collection apparatus according to an embodiment 1 of the present invention. FIG. 2 is a block diagram showing an electrical circuit of a detection apparatus according to the embodiment 1 of the present invention. FIG. 3 is a block diagram showing an electrical circuit of a relay apparatus according to the embodiment 1 of the present invention. FIG. 4 is a block diagram showing an electrical circuit of a main apparatus according to the embodiment 1 of the present invention.

Referring to FIG. 1, reference numeral 1 denotes a vehicle, which is an ordinary four-wheel passenger automobile. A detection apparatus 10 is secured to each rim of four wheels 2 of the vehicle 1 so that the detection apparatus 10 is positioned within the tire. Also, a relay apparatus 20 is provided in a vicinity of each wheel 2 in a vehicle side. In addition, a main apparatus 30 is disposed in a vicinity of a driver seat so that a display unit can be seen from the driver. A condition information collection apparatus according to the present embodiment includes the above described four detection apparatuses 10, four relay apparatuses 20 and one main apparatus 30.

As shown in FIG. 2, the detection apparatus 10 includes a sensor section 11, central processing section 12, transmission section 13, antenna 14, and battery 15 which is a power source to drive these sections.

The sensor section 11 includes a pressure sensor 111 to detect a air pressure within tire, a temperature sensor 112 to detect a temperature within tire, and analog-to-digital (hereinafter, simply referred to as A/D) converter circuits 113 and 114.

The pressure sensor 111 detects an air pressure within tire and outputs to the A/D converter circuit 113 an analog electrical signal corresponding to the detected air pressure value.

The temperature sensor 112 detects a temperature within tire and outputs to the A/D converter circuit 114 an analog electrical signal corresponding to the detected temperature value.

The A/D converter circuit 113 converts the analog electrical signal value received from the pressure sensor 111 into a digital value and outputs the value to a later-described CPU 121.

The A/D converter circuit 114 converts the analog electrical signal value received from the temperature sensor 112 into a digital value and outputs the value to a later-described CPU 121.

The central processing section 12 includes a known CPU 121 and storage section 122. The CPU 121 operates based on a program stored in a semiconductor memory of the storage section 122. When electrical power is supplied to drive the CPU 121, the CPU 121 transmits wirelessly the data detected by the sensor section 11 to the relay apparatus 20 at a predetermined interval by use of electromagnetic wave of a first frequency f1.

Also, in the program of the CPU 121, a setting is made such that, in transmitting the detection data, information having (1) a header indicating that the data is detection data and (2) specific identification information for each detection apparatus 10 each added to the detection data is transmitted as transmission information to the relay apparatus 20 via the transmission section 13.

The storage section 122 includes a ROM on which the program to cause the CPU 121 to operate is recorded, and an electrically rewritable nonvolatile semiconductor memory such as EEP ROM (electrically erasable programmable read-only memory). The specific identification information for each detection apparatus 10 is preliminarily stored in a non-rewritable area within the storage section 122 during manufacture.

The transmission section 13 includes a transmitter 131 and a digital-to-analog (hereinafter, simply referred to as D/A) converter circuit 132. The transmitter 131 converts the transmission information received from the CPU 121 into a high frequency signal of a first frequency f1 and transmits the converted signal via the antenna 14. It is noted that the output power of the high frequency signal from the transmission section 13 is set to a small value which is sufficient for the electromagnetic wave to reach the relay apparatus 20 disposed in the vicinity thereof.

As shown in FIG. 3, the relay apparatus 20 includes a sensor section 21, central processing section 22, reception section 23, transmission section 24, antennas 25 and 26, and a battery 27 which is a power source to drive these sections.

The sensor section 21 includes a pressure sensor 211 to detect an atmospheric pressure outside tire in a vicinity of tire, a temperature sensor 212 to detect a temperature outside tire in a vicinity of tire, and A/D converter circuits 213 and 214.

The pressure sensor 211 detects an atmospheric pressure outside tire in a vicinity of tire and outputs to the A/D converter circuit 213 an analog electrical signal corresponding to the detected atmospheric pressure value.

The temperature sensor 212 detects a temperature outside tire in a vicinity of tire and outputs to the A/D converter circuit 214 an analog electrical signal corresponding to the detected temperature value.

The A/D converter circuit 213 converts the analog electrical signal value received from the pressure sensor 211 into a digital value and outputs the value to a later-described CPU 221.

The A/D converter circuit 214 converts the analog electrical signal value received from the temperature sensor 212 into a digital value and outputs the value to a later-described CPU 221.

The central processing section 22 includes a known CPU 221 and storage section 222. The CPU 221 operates based on a program stored in a semiconductor memory of the storage section 222. With electrical power supplied to drive the CPU 221, when the detection information is received from the detection apparatus 10, data detected by the sensor section 21 as well as the received detection information is wirelessly transmitted to the main apparatus 30 by use of electromagnetic wave of a second frequency f2.

Also, in the program of the CPU 221, a setting is made such that, in transmitting the information, information having (1) a header indicating that the data is detection data and (2) specific identification information for each relay apparatus 20 each added to the detection data is transmitted as transmission information to the main apparatus 30 via the transmission section 24.

The storage section 222 includes a ROM on which a program to cause the CPU 221 to operate is recorded, and an electrically rewritable nonvolatile semiconductor memory such as EEP ROM (electrically erasable programmable read-only memory). The specific identification information for each relay apparatus 20 is preliminarily stored in a non-rewritable area within the storage section 222 during manufacture.

The reception section 23 includes a receiver 231 and an A/D converter circuit 232. The information transmitted from the detection apparatus 10 is received via an antenna 25 connected to the input side of the receiver 231, is subjected to wave detection, and then is outputted to the CPU 221 via the A/D converter circuit 232.

The transmission section 24 includes a transmitter 241 and D/A converter circuit 242. The transmitter 241 converts the transmission information to be sent to the main apparatus 30, received from the CPU 221, into a high frequency signal of a second frequency f2 and outputs the signal to an antenna 26.

According to the embodiment, the relay apparatus 20 is secured to the front section of a tire house. The installation location of the relay apparatus 20, however, may be anywhere in the vicinity of the wheel 2 in the vehicle side.

As shown in FIG. 4, the main apparatus 30 includes an antenna 31, reception section 32, central processing section 33 and display section 34. Electric power supplied from a battery of the vehicle is used to drive these sections.

The reception section 32 includes a receiver 321 and A/D converter circuit 322. The high frequency signal of electromagnetic wave of the second frequency f2 transmitted from the relay apparatus 20 is received via the antenna 31 connected to the input side of the receiver 321, is subjected to wave detection, and then is outputted to the central processing section 33 via the A/D converter circuit 322.

The central processing section 33, which includes a known CPU 331 and storage section 332, displays on the display section 34 the tire air pressure information, tire temperature information, etc. obtained by applying arithmetic processing to the sensor detection information received from the relay apparatus 20. At this time, the central processing section 33 acquires only the information containing the identification information of the relay apparatus 20 preliminarily stored in the storage section 332.

The storage section 332 includes a ROM on which a program to cause the CPU 331 to operate is recorded, and an electrically rewritable nonvolatile semiconductor memory such as EEP ROM. The specific identification information for each relay apparatus 20 corresponding to the location of each wheel 2 is preliminarily stored in a rewritable area.

Figure 6:
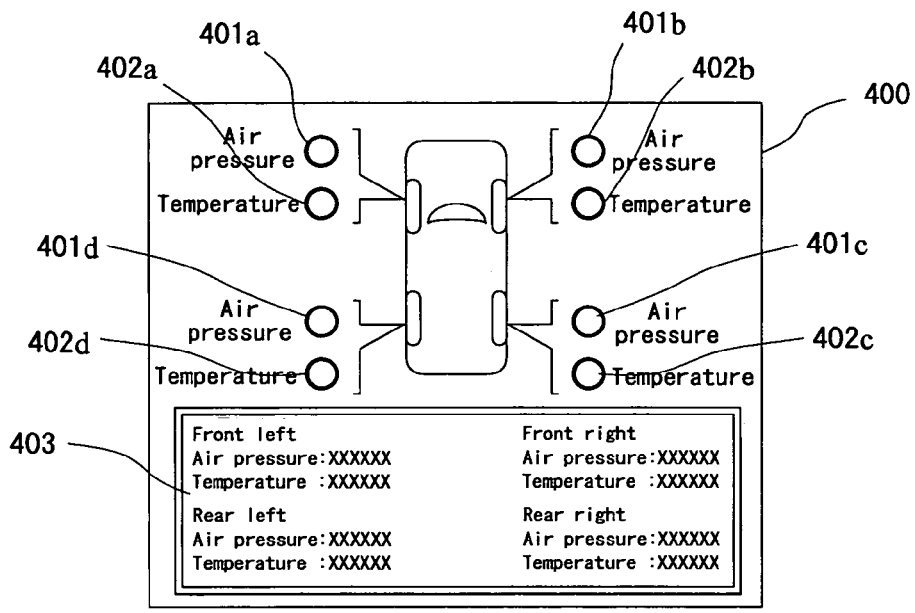
FIG. 6 is a diagram showing a display panel of the main apparatus according to the embodiment 1 of the present invention.

The display section 34 displays the sensor detection information for each relay apparatus 20 received from the CPU 331. Also, the display section 34 includes a display panel 400 as shown in FIG. 6. In the upper section of the display panel 400, there is drawn a graphic of the vehicle in the central section of the panel, so that the installation location of tire can be easily identified. In both sides thereof, there are disposed LEDs 401a to 401d indicating whether or not the tire air pressure is satisfactory, whose color is changed among red, yellow and green, and LEDs 402a to 402d indicating whether or not the temperature within tire is satisfactory, whose color is changed among red, yellow and green. The LEDs correspond to each tire. By employing such LEDs of three-color type, three conditions, i.e., abnormal condition, caution-needed condition and normal condition can be visually recognized with ease. In addition, in the lower section of the display panel 400, there is disposed a liquid crystal display unit 403 so that the air pressure and temperature of each tire are numerically displayed. Accordingly, more detailed detection information can be known.

Figure 5:
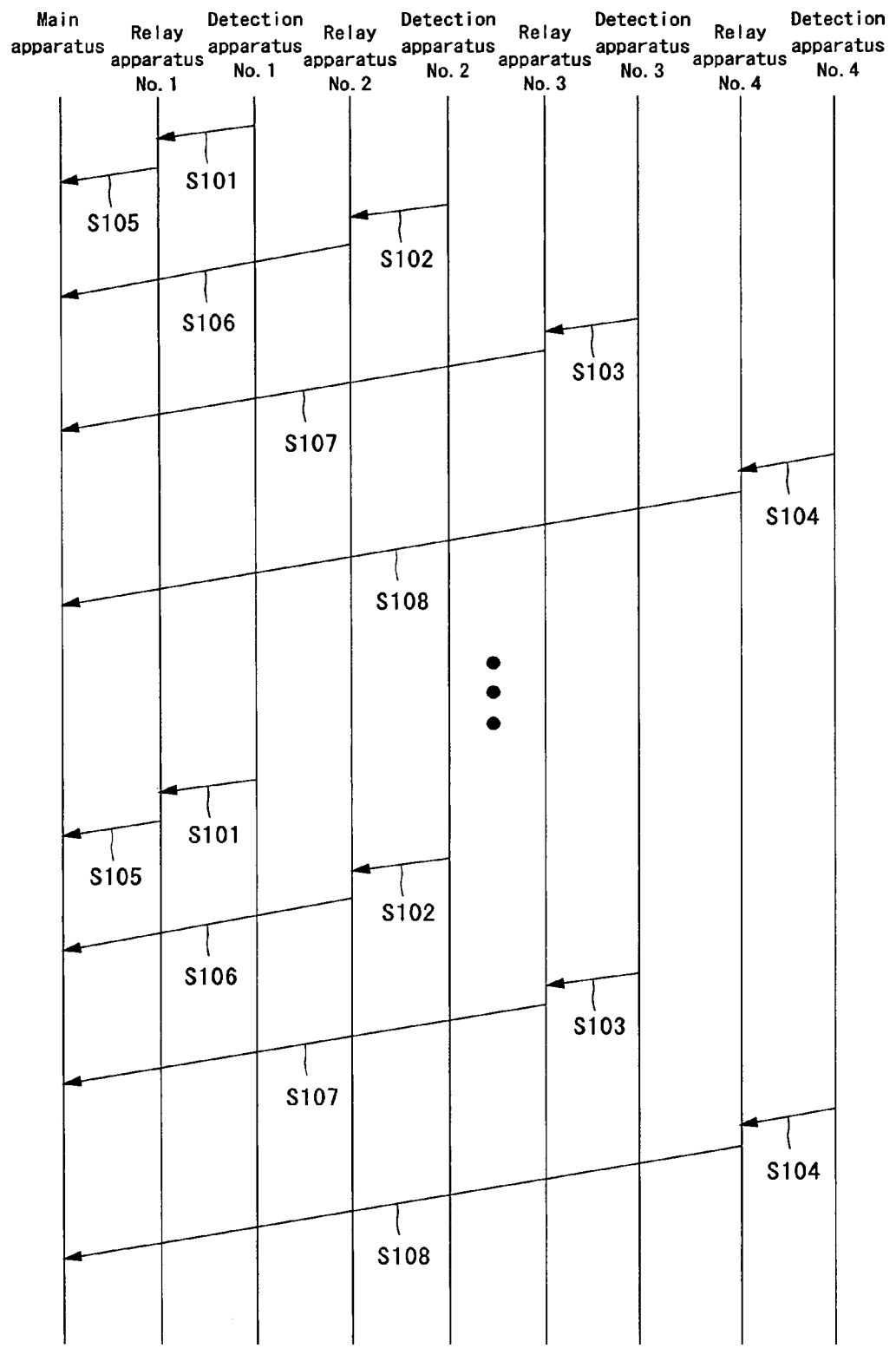
FIG. 5 is a diagram showing a procedure of communication between the detection apparatus, relay apparatus and main apparatus according to the embodiment 1 of the present invention.
Figure 7:
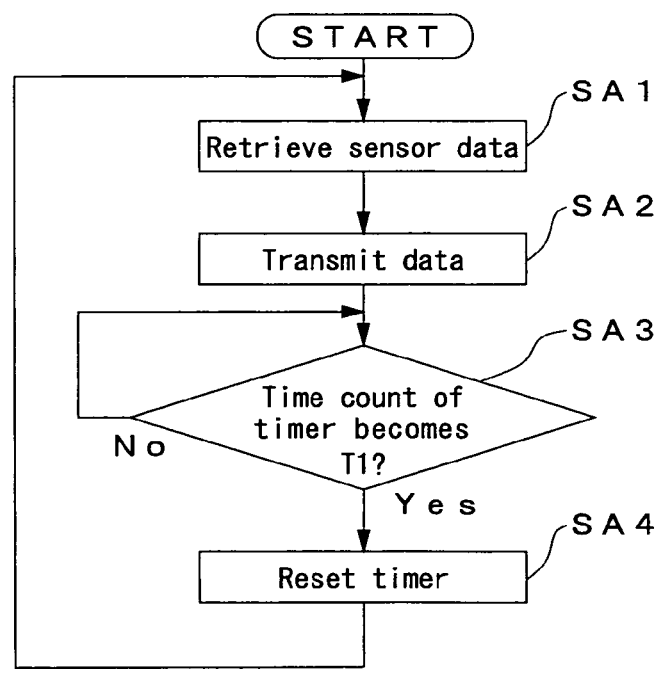
FIG. 7 is a flowchart showing an operation of the detection apparatus according to the embodiment 1 of the present invention.
Figure 8:
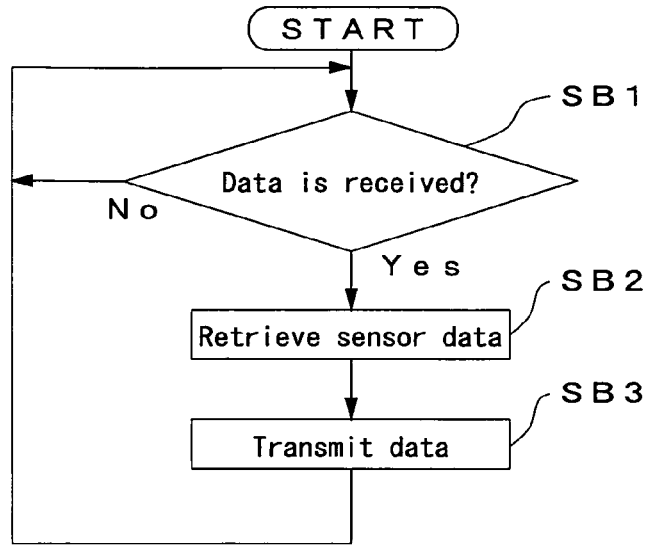
FIG. 8 is a flowchart showing an operation of the relay apparatus according to the embodiment 1 of the present invention.
Figure 9:
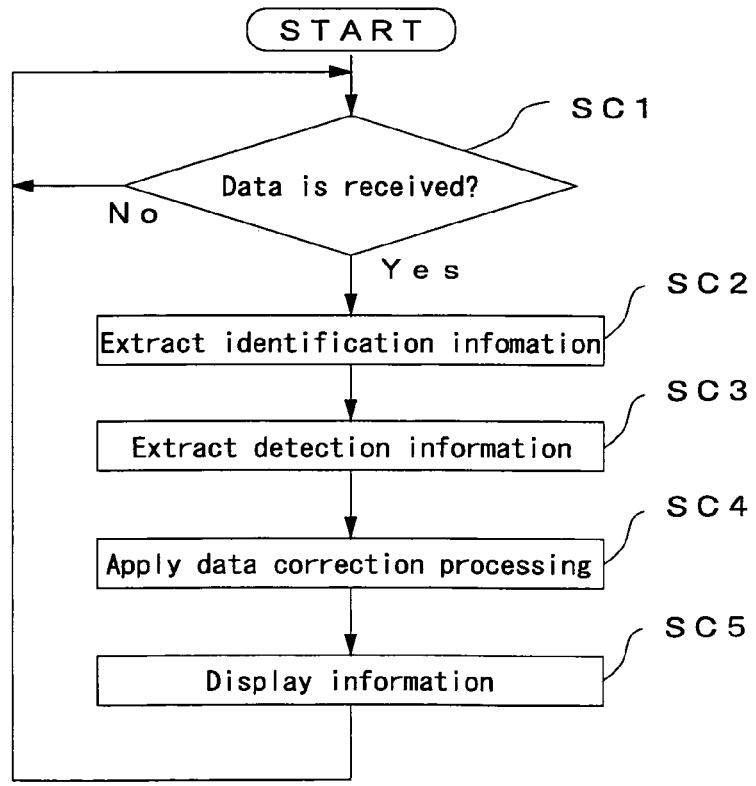
FIG. 9 is a flowchart showing an operation of the main apparatus according to the embodiment 1 of the present invention.

An operation of the tire condition information collection apparatus having the above described configuration will now be described with reference to the flowcharts shown in FIGS. 5 and 7 to 9. FIG. 5 is a diagram for explaining a procedure of communication between the detection apparatus 10, relay apparatus 20 and main apparatus 30. FIG. 7 is a flowchart showing an operation of the detection apparatus 10. FIG. 8 is a flowchart showing an operation of the relay apparatus 20. FIG. 9 is a flowchart showing an operation of the main apparatus.

The CPU 121 of the detection apparatus 10 retrieves the pressure and temperature data within tire detected by the pressure sensor 111 and temperature sensor 112 of the sensor section 11 (SA1), and wirelessly transmits the retrieved data to the relay apparatus 20 by use of electromagnetic wave of the first frequency f1 (SA2, S101 to S104). At this time, information having (1) a header indicating that the data is detection data and (2) specific identification information for each detection apparatus 10 each added to the detection data is transmitted as transmission information to the relay apparatus 20.

Then, it is determined whether or not the time count of a timer becomes T1 (SA3). If so, the timer is reset (SA4), and the flow proceeds to the above process SA1. According to the embodiment, the time T1 is set to about 3 to 5 minutes but is not limited thereto; T1 may be appropriately set. Also, the timing of information transmission from each detection apparatus 10 is at random. The time taken to perform one information transmission is several tens of milliseconds.

The CPU 221 of the relay apparatus 20 monitors whether or not the detection data is received from the detection apparatus 10 (SB1). When the detection data is received, the CPU 221 retrieves the atmospheric pressure and temperature data outside tire detected by the pressure sensor 211 and temperature sensor 212 of the sensor section 21 (SB2), and wirelessly transmits the retrieved data and the detection data received from the detection apparatus 10 to the main apparatus 30 by use of electromagnetic wave of the second frequency f2 (SB3, S105 to S108). In transmitting the information, information having (1) a header indicating that the data is detection data and (2) specific identification information for each relay apparatus 20 each added to the above data is transmitted as transmission information to the main apparatus 30.

The CPU 331 of the main apparatus 30 monitors whether or not the data is received from the relay apparatus 20 (SC1). When the data is received, the CPU 331 extracts the identification information of the relay apparatus 20 from the received data (SC2), and at the same time extracts the detection data from the sensor section 11 of the detection apparatus 10 and the detection data from the sensor section 21 of the relay apparatus 20 (SC3).

Then, the CPU 331 of the main apparatus 30 performs a data correction processing (SC4) and displays the information on the display section 34 based on the corrected data (SC5).

With the above described data correction processing, a pressure value obtained by correcting the pressure value detected by the pressure sensor 111 of the detection apparatus 10 by use of the atmospheric pressure value detected by the pressure sensor 211 of the relay apparatus 20 is defined as the air pressure value of tire. In addition, it is determined whether or not the temperature value of tire detected by the temperature sensor 112 of the detection apparatus 10 is normal relative to the outside air temperature value detected by the temperature sensor 212 of the relay apparatus 20.

While pressure within tire is usually managed by use of gauge pressure (relative value), an absolute value is detected by the pressure sensor 111. Thus, the detected pressure within tire varies according to the change of atmospheric pressure. Accordingly, in the present embodiment, a gauge pressure obtained by correcting the influence given by the change of atmospheric pressure by use of the following formula (1) is displayed as pressure within tire.

Air pressure within tire (gauge pressure)=Tire detection pressure (absolute value)−Atmospheric pressure (1)

With this correction, the management of air pressure within tire can be made more accurate, thus enabling achievement of the improvement of tire durability. Also, the correction may be made by use of the known International Standard Atmosphere (ISA) of the International Civil Aviation Organization (ICAO), for example.

Also, when the change of temperature within tire is large relative to the temperature rise around tire, it can be presumed that the tire load is large. Accordingly, it is possible to accurately inform of whether or not the tire temperature is normal, thus enabling achievement of the improvement of safety.

The first frequency f1 and second frequency f2 may be the same or different. Also, the first frequency f1 and second frequency f2 may be a frequency of any one of the frequency bands from the Low Frequency band to the Ultra High Frequency band. However, in consideration of the miniaturization and efficiency of antenna, a frequency of the frequency bands from the Very High Frequency band to the Ultra High Frequency band is preferably employed.

Embodiment 2

Figure 10:
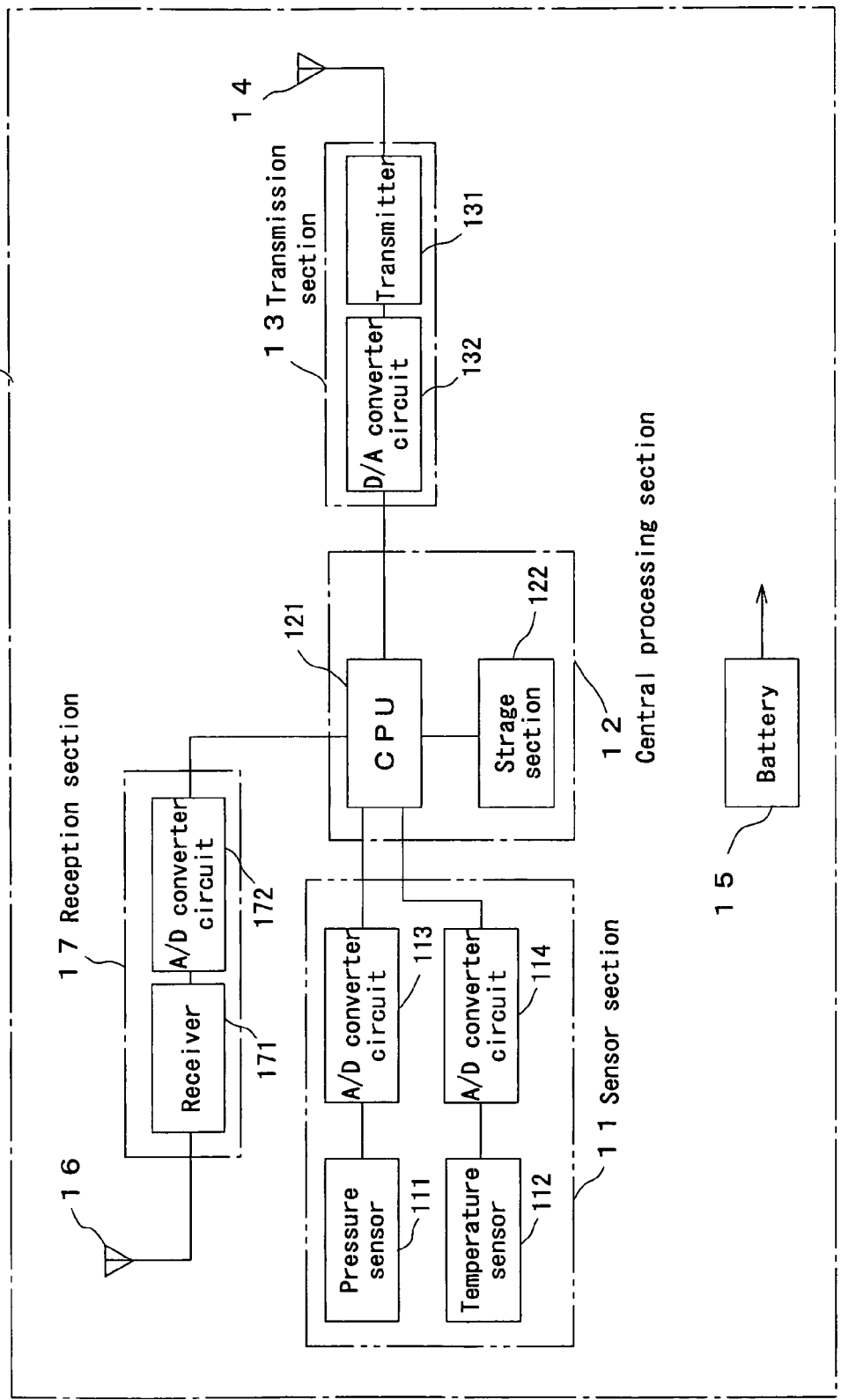
FIG. 10 is a block diagram showing an electrical circuit of a detection apparatus according to an embodiment 2 of the present invention.
Figure 11:
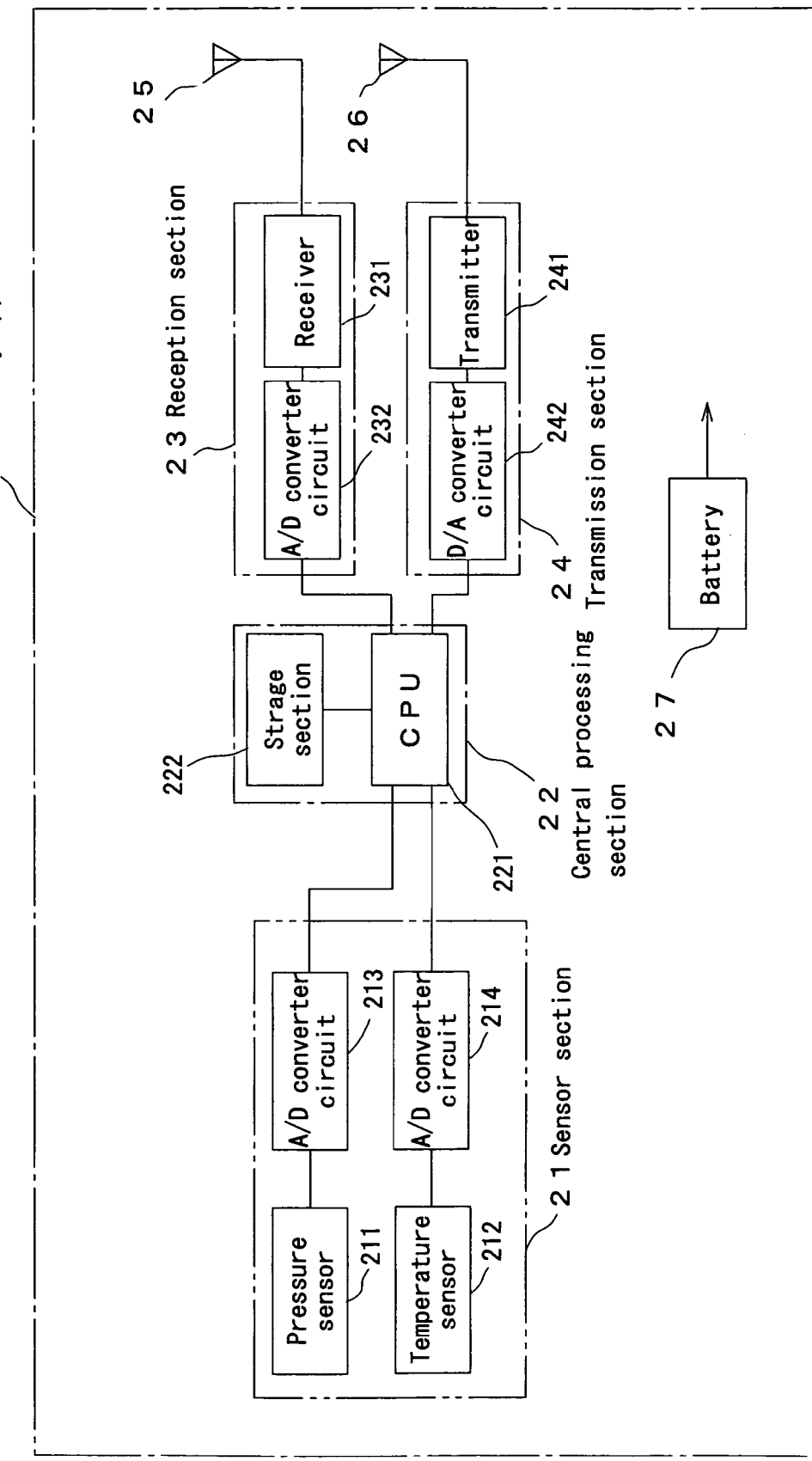
FIG. 11 is a block diagram showing an electrical circuit of a relay apparatus according to the embodiment 2 of the present invention.
Figure 12:
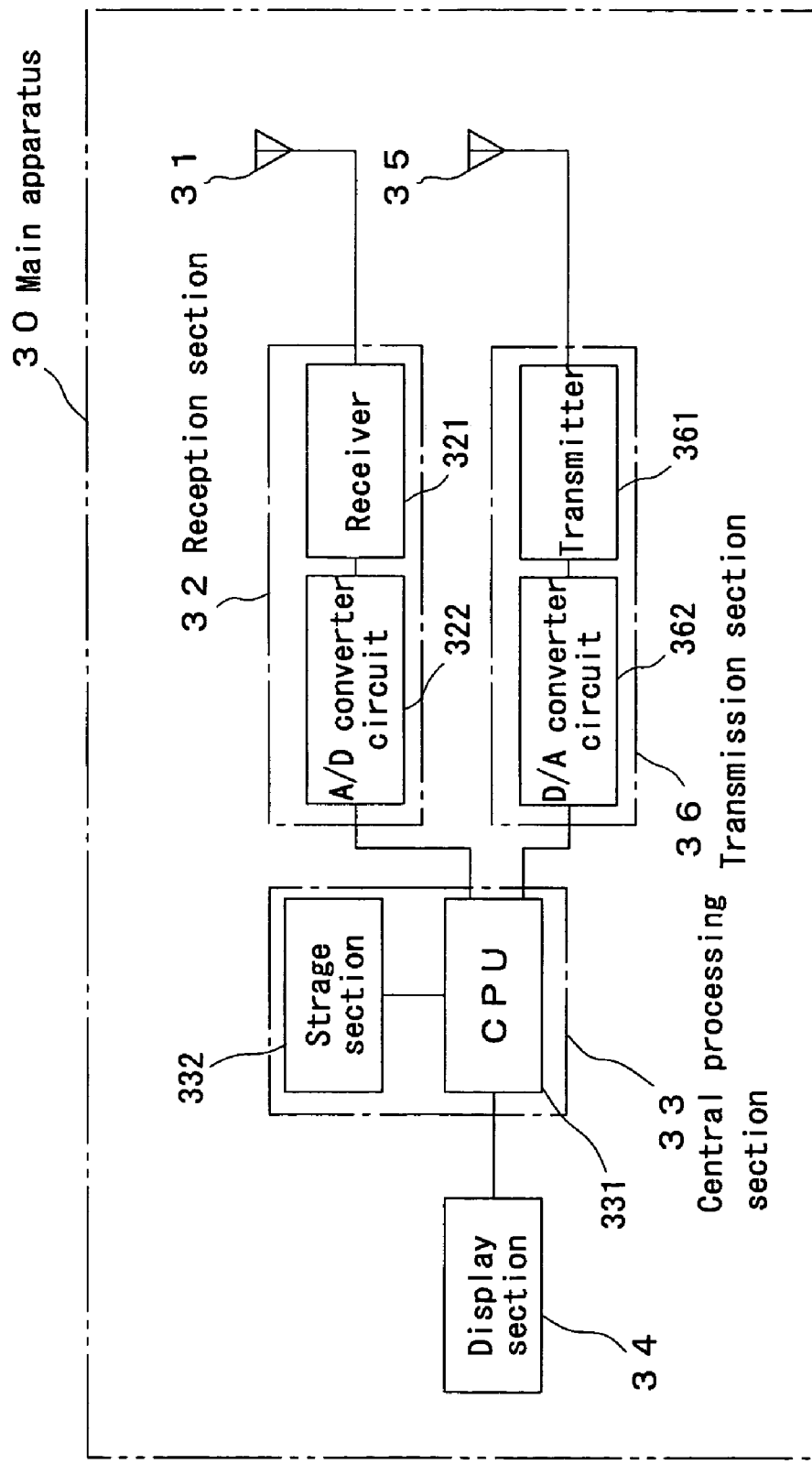
FIG. 12 is a block diagram showing an electrical circuit of a main apparatus according to the embodiment 2 of the present invention.

FIG. 10 is a block diagram showing an electrical circuit of a detection apparatus according to an embodiment 2 of the present invention. FIG. 11 is a block diagram showing an electrical circuit of a relay apparatus according to the embodiment 2 of the present invention. FIG. 12 is a block diagram showing an electrical circuit of a main apparatus according to the embodiment 2 of the present invention.

In these drawings, the same reference numerals are applied to parts corresponding to the embodiment 1, and an explanation thereof is omitted. The difference between the embodiment 2 and the above described embodiment 1 is that: a reception antenna 16 and a reception section 17 are provided in the detection apparatus; a transmission antenna 35 and a transmission section 36 are provided in the main apparatus 30; and each one of the detection apparatus 10 and relay apparatus 20 transmits data when an information request signal is received.

A reception section 17 of the detection apparatus 10 includes a receiver 171 and an A/D converter circuit 172. An information request signal transmitted from the relay apparatus 20 by use of electromagnetic wave of the second frequency f2 is received via the antenna 16 connected to the input side of the receiver 171, is subjected to wave detection, and then is outputted to the CPU 121 via the A/D converter circuit 172.

A computer program stored in the storage section 122 of the detection apparatus 10 is different from that of the embodiment 1. With this program, the CPU 121 transmits the detection data to the relay apparatus 20 only when an information request signal containing the self identification information is received from the relay apparatus 20.

Also, a computer program stored in the storage section 222 of the relay apparatus 20 is different from that of the embodiment 1. With this program, the CPU 221 transmits an information request signal to the detection apparatus 10 only when the information request signal having the self identification information specified therein is received from the main apparatus 30. The information request signal sent from the relay apparatus 20 to the detection apparatus 10 contains the identification information of the detection apparatus 10, thereby enabling specification of the detection apparatus 10.

The transmission section 36 of the main apparatus 30 includes a transmitter 361 and D/A converter circuit 362. The transmitter 361 converts an information request signal to be sent to the relay apparatus 20 received from the CPU 331 into a high frequency signal of a first frequency f1, and outputs the signal to the antenna 35.

Also, a computer program stored in the storage section 332 of the main apparatus 30 is different from that of the embodiment 1. With this program, the CPU 331 transmits an information request signal to each relay apparatus 20 at a predetermined interval to acquire information from each relay apparatus 20. The information request signal sent from the main apparatus 30 to the relay apparatus 20 contains the identification information of the relay apparatus 20, whereby any one of the respective relay apparatuses 20 can be specified for the information request.

Figure 13:
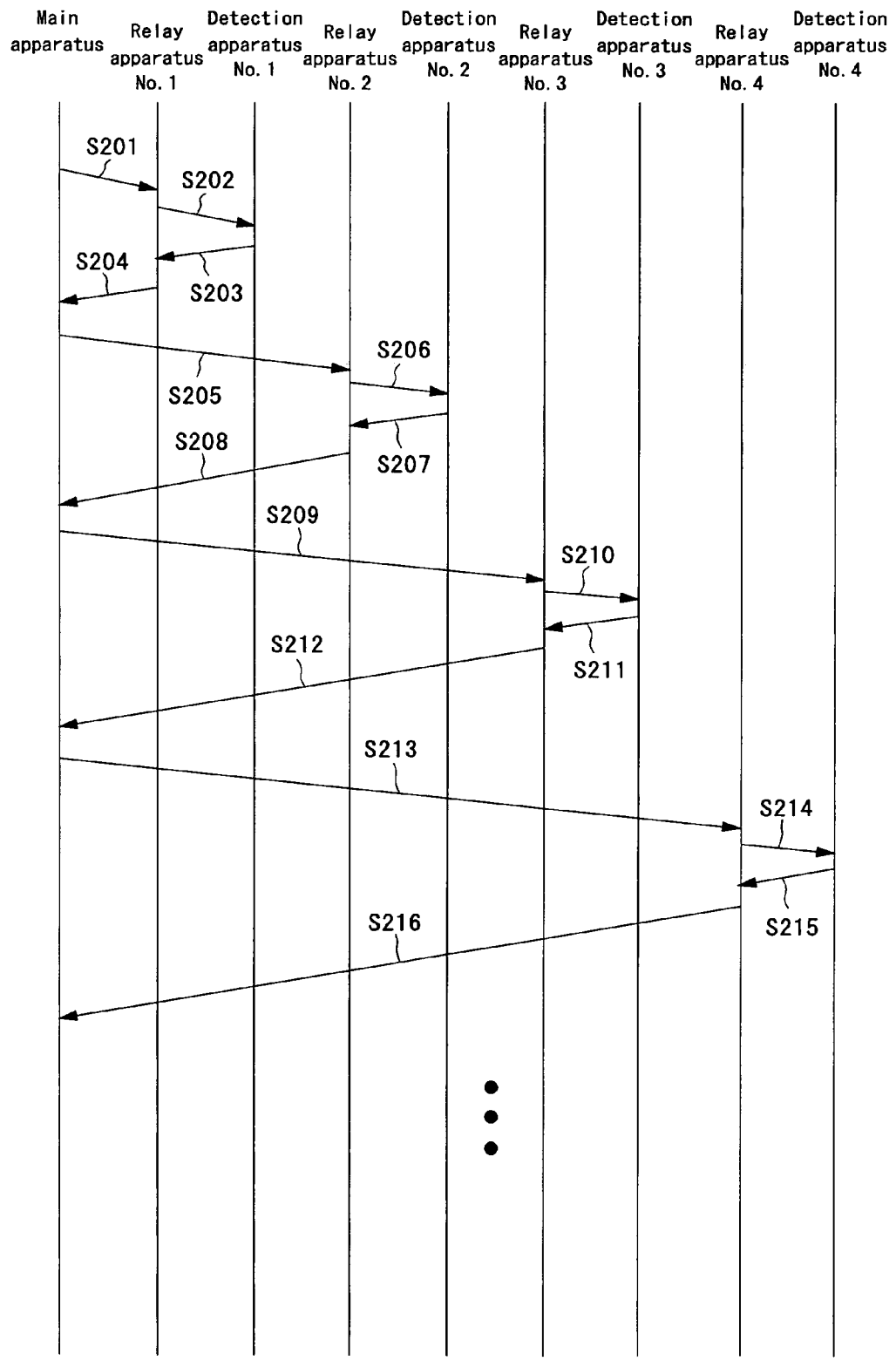
FIG. 13 is a diagram showing a procedure of communication between the detection apparatus, relay apparatus and main apparatus according to the embodiment 2 of the present invention.
Figure 14:
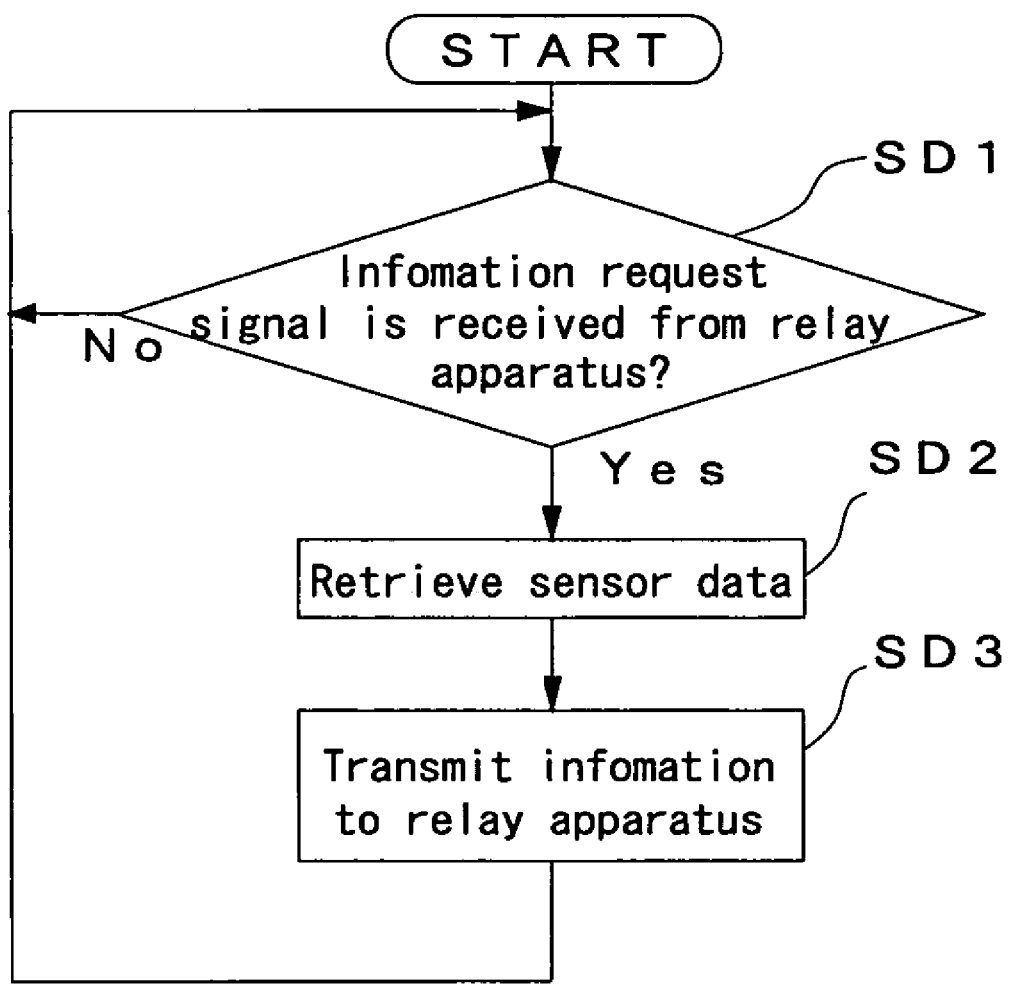
FIG. 14 is a flowchart showing an operation of the detection apparatus according to the embodiment 2 of the present invention.
Figure 15:
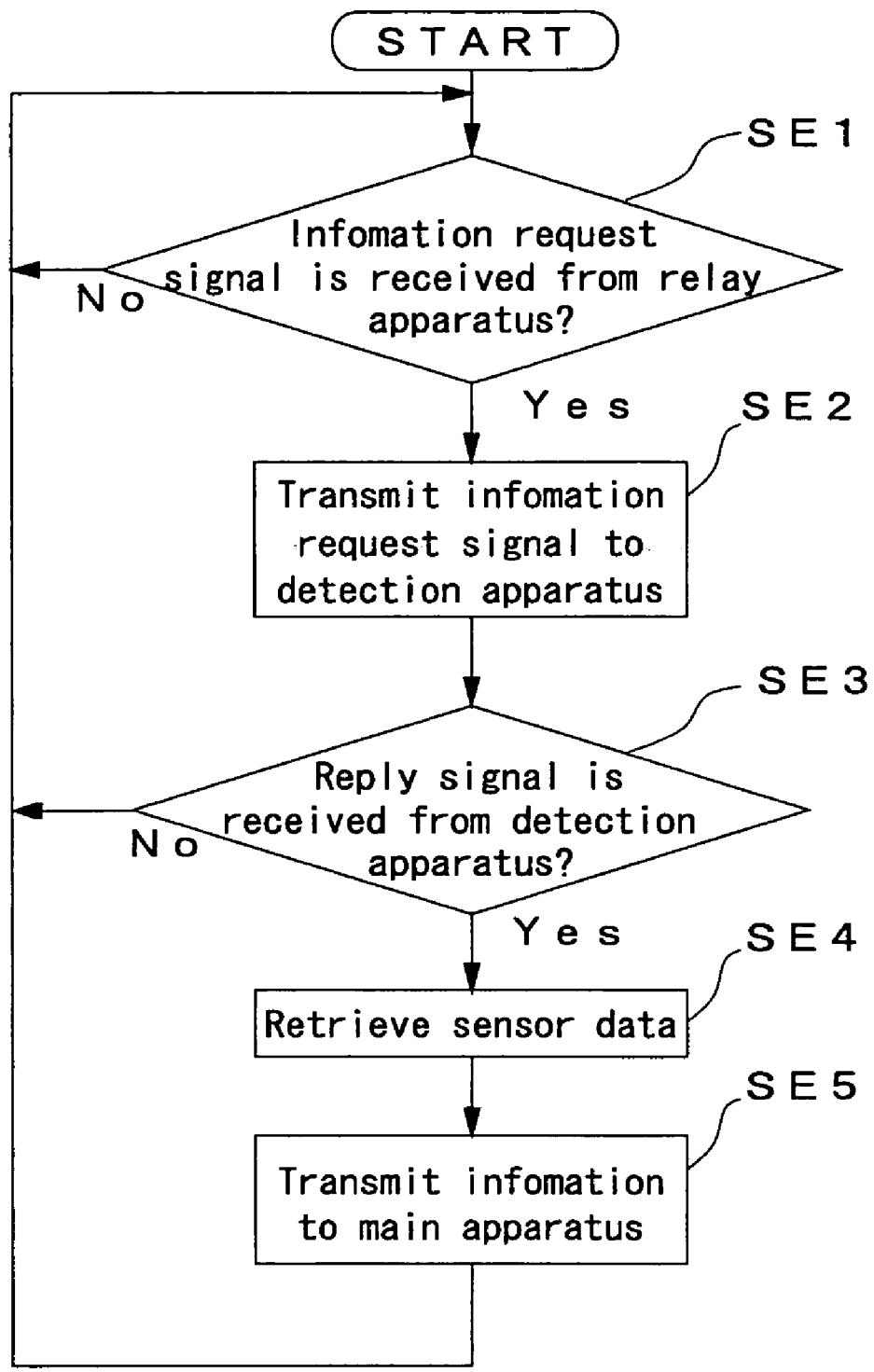
FIG. 15 is a flowchart showing an operation of the relay apparatus according to the embodiment 2 of the present invention.
Figure 16:
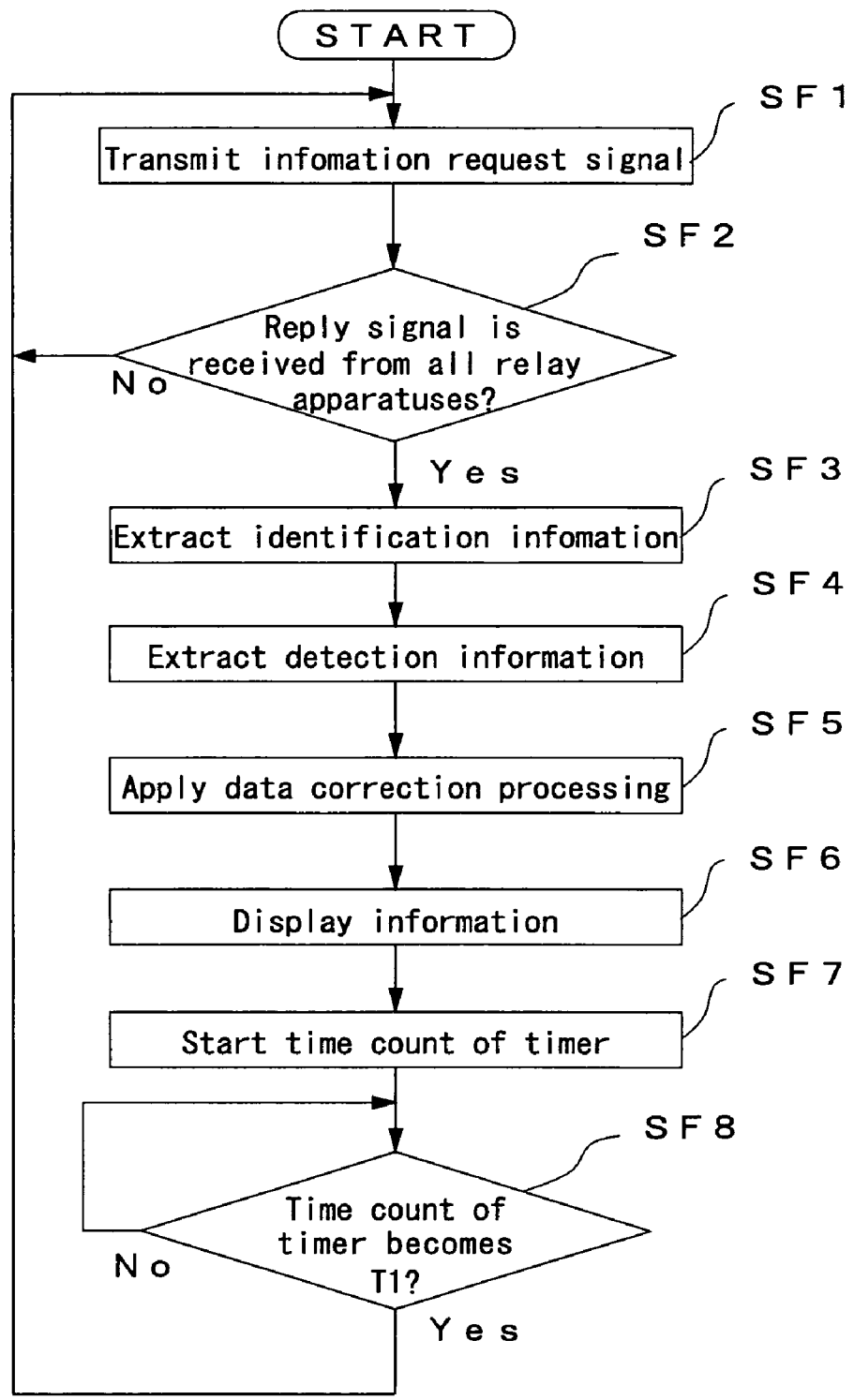
FIG. 16 is a flowchart showing an operation of the main apparatus according to the embodiment 2 of the present invention.

An operation of the tire condition information collection apparatus having the above described configuration will now be described with reference to the flowcharts shown in FIGS. 13 and 14 to 16. FIG. 13 is a diagram showing a procedure of communication between the detection apparatus 10, relay apparatus 20 and main apparatus 30. FIG. 14 is a flowchart showing an operation of the detection apparatus 10. FIG. 15 is a flowchart showing an operation of the relay apparatus 20. FIG. 16 is a flowchart showing an operation of the main apparatus.

The CPU 121 of the detection apparatus 10 monitors whether or not an information request signal is received from the relay apparatus 20 (SD1). When the information request signal is received (S202, S206, S210, S214), the CPU 221 retrieves the air pressure and temperature data within tire detected by the pressure sensor 111 and temperature sensor 112 of the sensor section 11 (SD2), and wirelessly transmits the retrieved data to the relay apparatus 20 by use of electromagnetic wave of the first frequency f1 (SD3, S203, S207, S211, S215). At this time, information having (1) a header indicating that the data is detection data and (2) specific identification information for each detection apparatus 10 each added to the detection data is transmitted as transmission information to the relay apparatus 20.

Then, it is determined whether or not the time count of a timer becomes T1. If so, the timer is reset, and the flow proceeds to the above process SD1. According to the embodiment, the time T1 is set to about 3 to 5 minutes but is not limited thereto; T1 may be appropriately set. Also, the timing of information transmission from each detection apparatus 10 is at random. The time taken to perform one information transmission is several tens of milliseconds.

The CPU 221 of the relay apparatus 20 monitors whether or not an information request signal is received from the main apparatus 30 (SE1). When the information request signal is received (S201, S205, S209, S213), the CPU 221 transmits the information request signal to the detection apparatus 10 (SE2, S202, S206, S210, S214). Then, it is determined whether or not a reply signal, i.e., the detection data is received from the detection apparatus 10 (SE3). When it is determined that the detection data is received (S203, S207, S211, S215), the CPU 221 retrieves the atmospheric pressure and temperature data outside tire detected by the pressure sensor 211 and temperature sensor 212 of the sensor section 21 (SE4), and wirelessly transmits the retrieved data and the detection data received from the detection apparatus 10 to the main apparatus 30 by use of electromagnetic wave of the second frequency f2 (SE5, S204, S208, S212, S216). At this time, information having (1) a header indicating that the data is detection data and (2) specific identification information for each relay apparatus 20 each added to the above data is transmitted as transmission information to the main apparatus 30.

The CPU 331 of the main apparatus 30 sequentially transmits an information request signal to each relay apparatus 20 (SF1, S201, S205, S209, S213), and determines whether or not the reply signal, i.e., the detection data is received from all the relay apparatuses 20 (SF2). When it is determined that each detection data is received (S204, S208, S212, S216), the identification information of the relay apparatus 20 is extracted from the received data (SF3), and at the same time the detection data from the sensor section 11 of the detection apparatus 10 and the detection data from the sensor section 21 of the relay apparatus 20 are extracted from the received data (SF4).

Then, the CPU 331 of the main apparatus 30 performs the data correction processing (SF5). Based on the corrected data, the display section 34 displays the information (SF6).

Then, the CPU 331 starts the timer count (SF7), and it is determined whether or not the time count becomes T1 (SF8). If so, the flow proceeds to the above process SF1.

Embodiment 3

Figure 17:
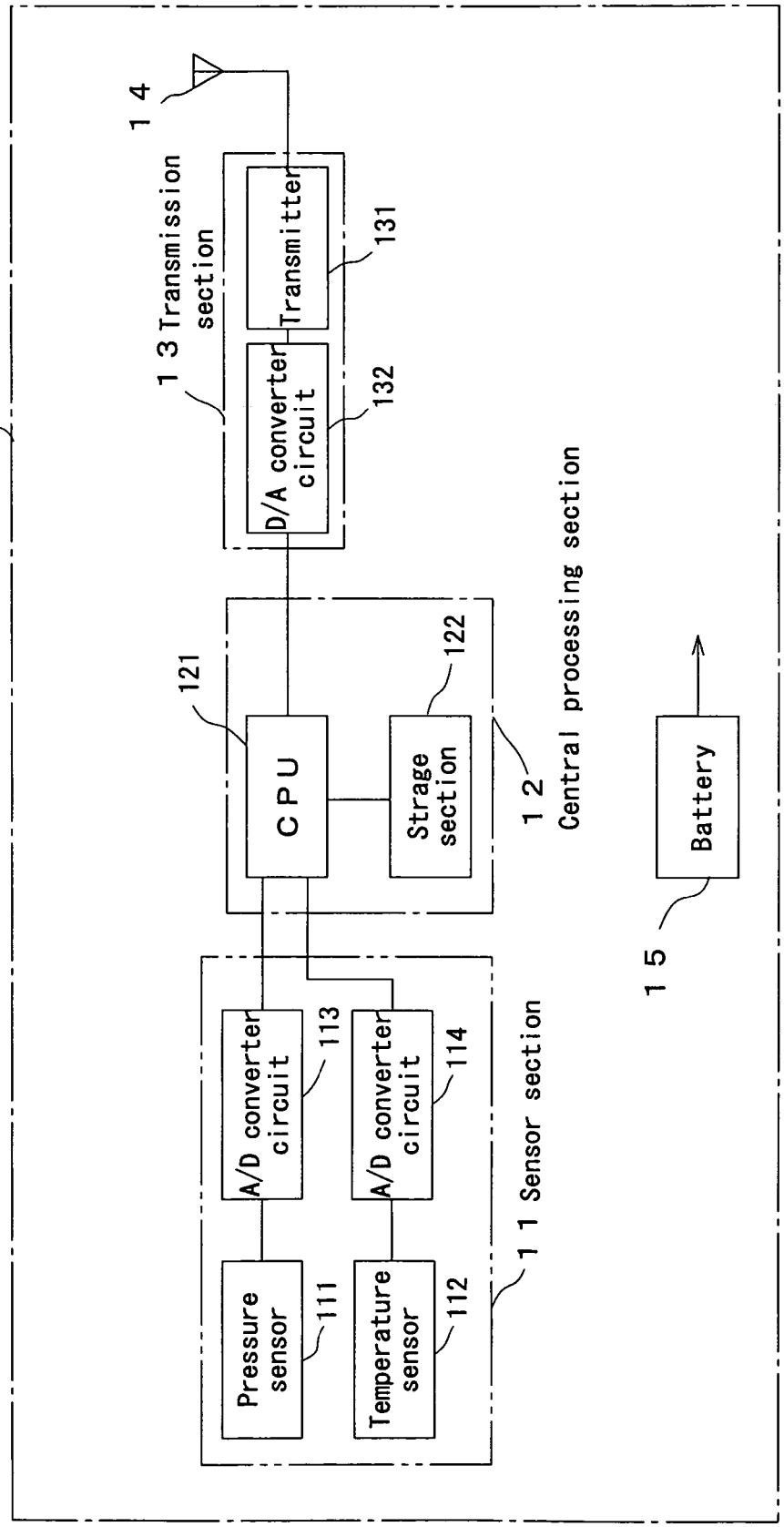
FIG. 17 is a block diagram showing an electrical circuit of a detection apparatus according to an embodiment 3 of the present invention.
Figure 18:
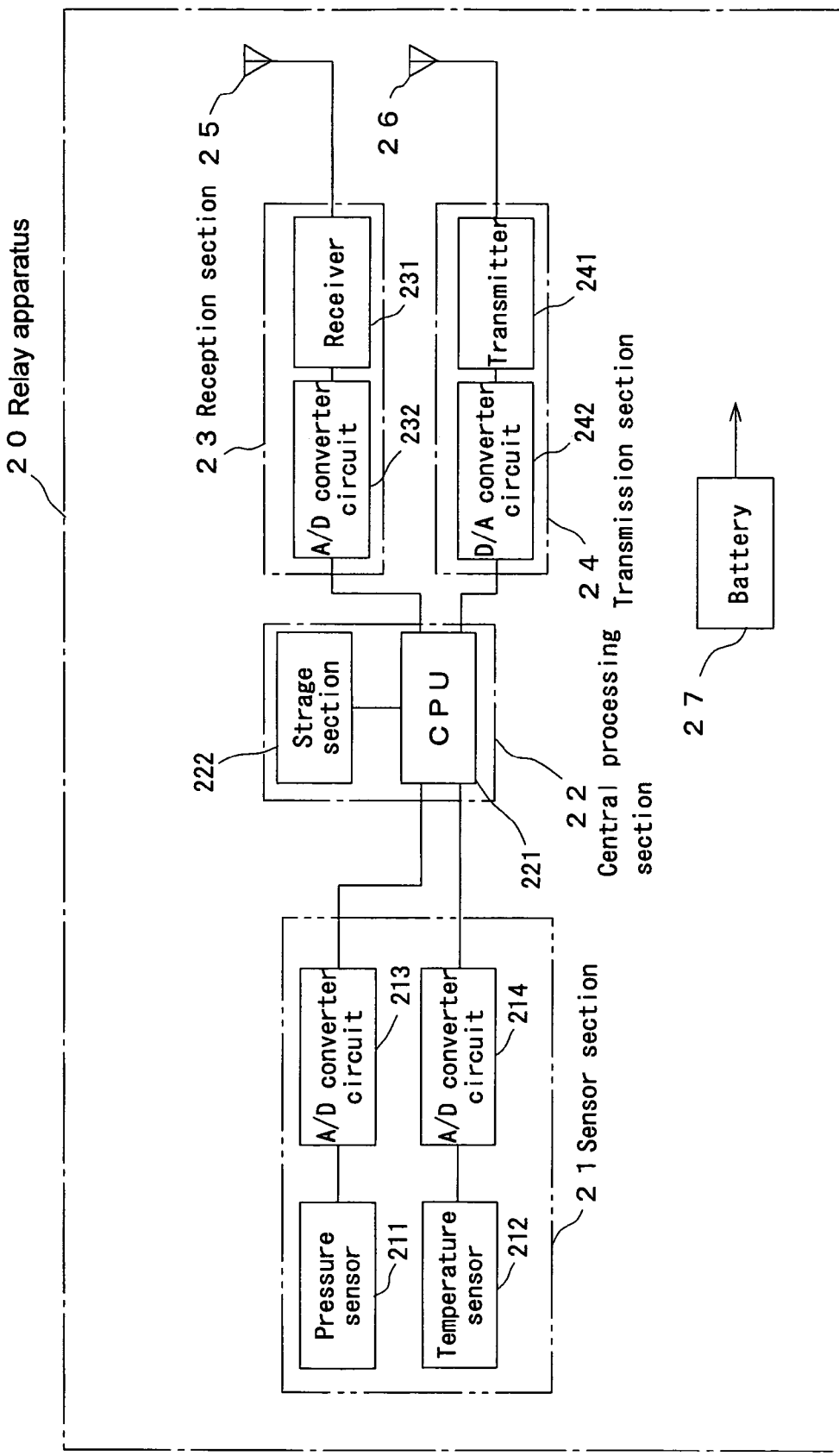
FIG. 18 is a block diagram showing an electrical circuit of a relay apparatus according to the embodiment 3 of the present invention.
Figure 19:
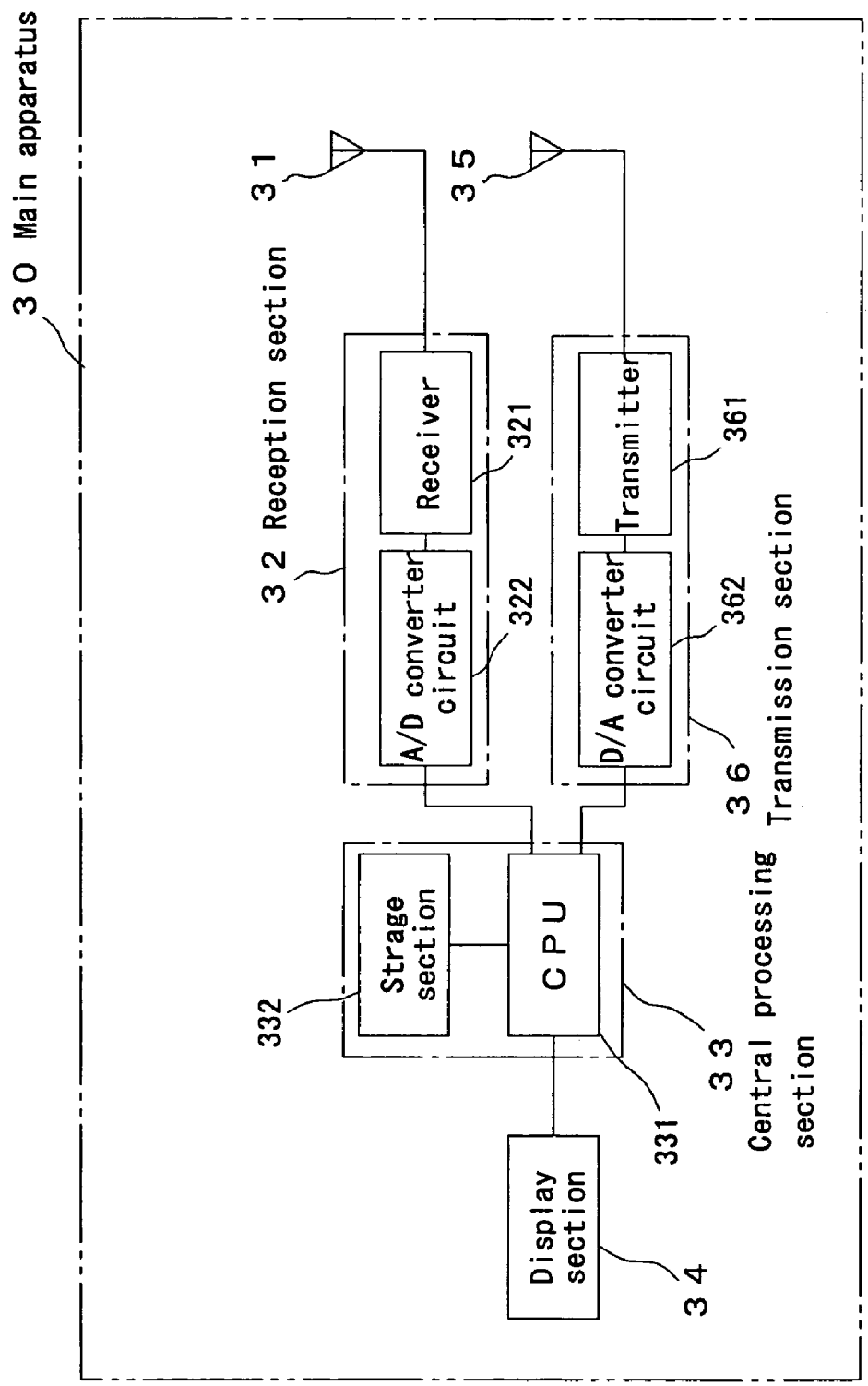
FIG. 19 is a block diagram showing an electrical circuit of a main apparatus according to the embodiment 3 of the present invention.

FIG. 17 is a block diagram showing an electrical circuit of a detection apparatus according to an embodiment 3 of the present invention. FIG. 18 is a block diagram showing an electrical circuit of a relay apparatus according to the embodiment 3 of the present invention. FIG. 19 is a block diagram showing an electrical circuit of a main apparatus according to the embodiment 3 of the present invention.

In these drawings, the same reference numerals are applied to parts corresponding to the embodiment 1, and an explanation thereof is omitted. The difference between the embodiment 3 and the above described embodiment 1 is that: a transmission antenna 35 and a transmission section 36 are provided in the main apparatus 30; and the relay apparatus 20 transmits data when an information request signal is received from the main apparatus 30.

The transmission section 36 of the main apparatus 30 includes a transmitter 361 and D/A converter circuit 362. The transmitter 361 converts an information request signal for the relay apparatus 20 received from the CPU 331 into a high frequency signal of a first frequency f1, and outputs the signal to the antenna 35.

A computer program stored in the storage section 332 of the main apparatus 30 is different from that of the embodiment 1. With this program, the CPU 331 transmits the information request signal to each relay apparatus 20 at a predetermined interval T2 to acquire information from each relay apparatus 20. The information request signal sent from the main apparatus 30 to the relay apparatus 20 contains the identification information of the relay apparatus 20, whereby any one of the respective relay apparatuses 20 can be specified for the information request.

According to the present embodiment, similarly to the embodiment 1, the detection apparatus 10 transmits the detection data at a predetermined interval T1. When receiving the data, the relay apparatus 20 stores the received detection data. Then, when receiving the information request signal from the main apparatus 30, the relay apparatus 20 transmits the stored detection data and the data detected by the sensor section 21 to the main apparatus 30.

Figure 20:
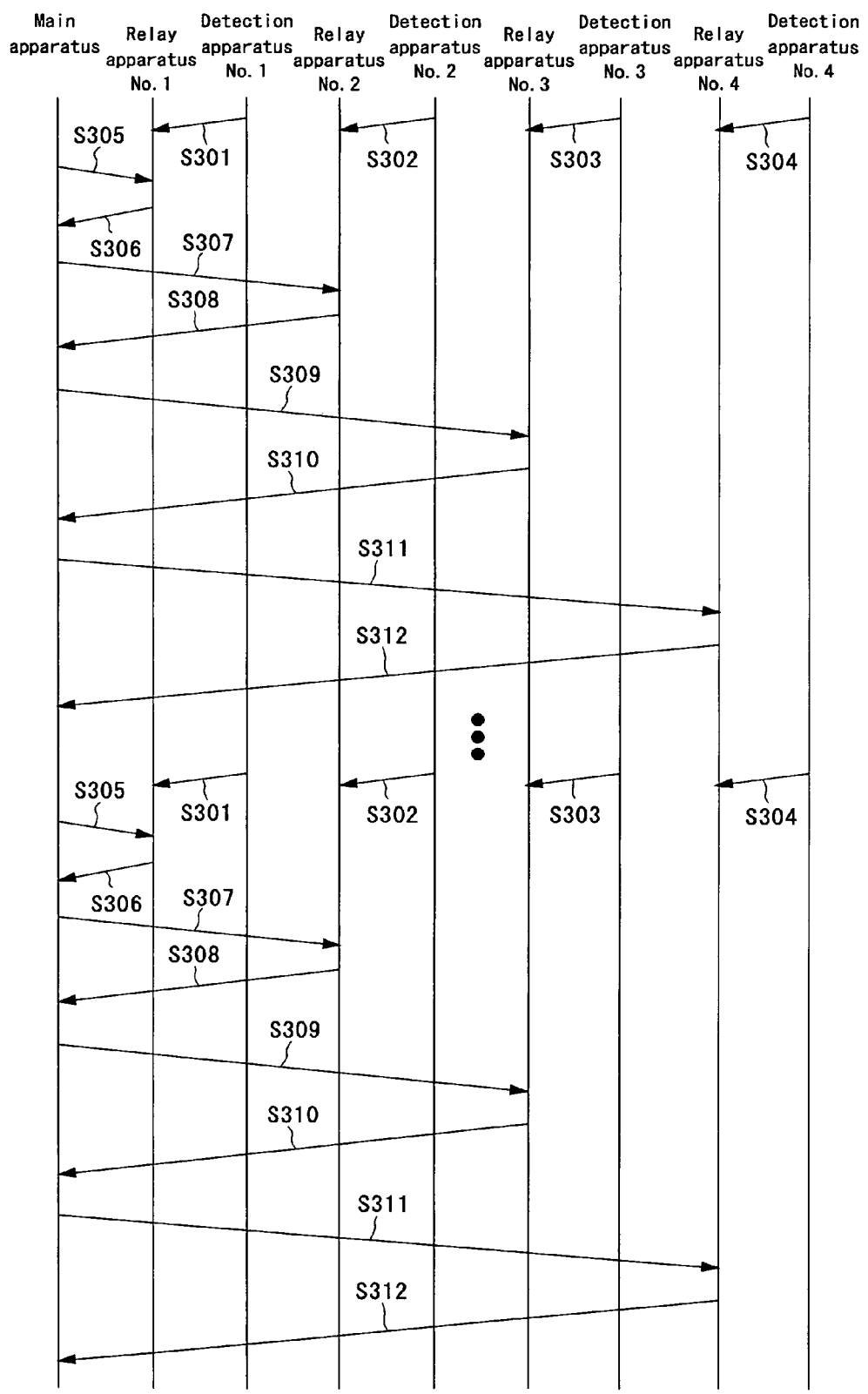
FIG. 20 is a diagram showing a procedure of communication between the detection apparatus, relay apparatus and main apparatus according to the embodiment 3 of the present invention.
Figure 21:
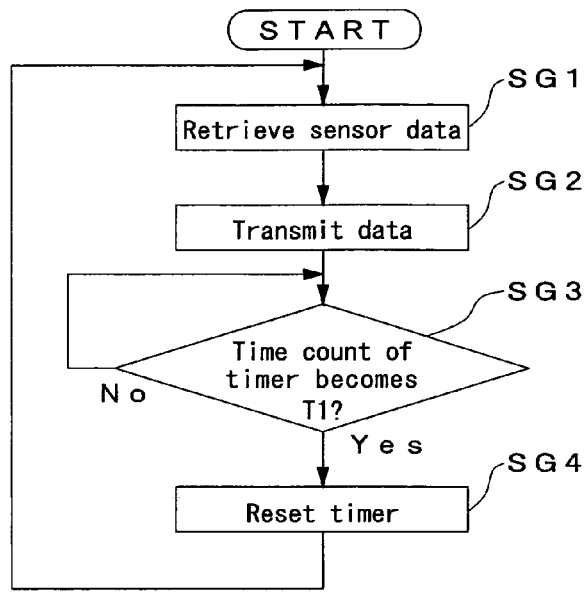
FIG. 21 is a flowchart showing an operation of the detection apparatus according to the embodiment 3 of the present invention.
Figure 22:
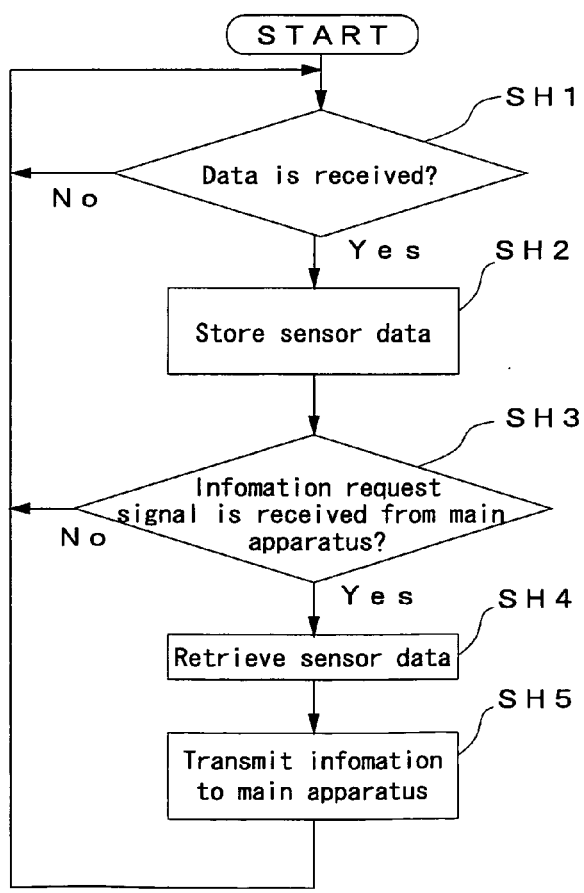
FIG. 22 is a flowchart showing an operation of the relay apparatus according to the embodiment 3 of the present invention.
Figure 23:
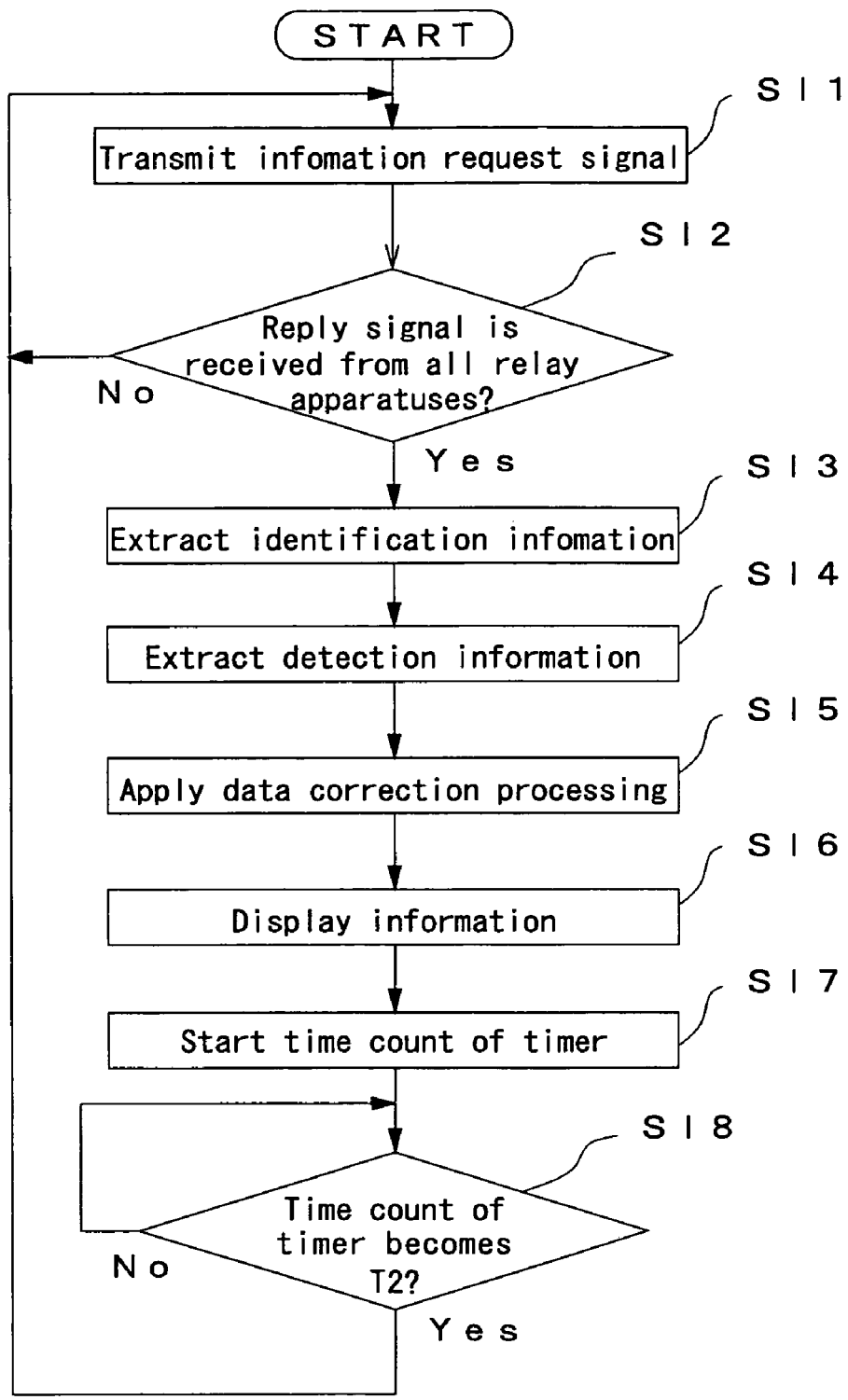
FIG. 23 is a flowchart showing an operation of the main apparatus according to the embodiment 3 of the present invention.

A detailed operation of the present embodiment will be described below with reference to the flowcharts shown in FIGS. 20 and 21 to 23. FIG. 20 is a diagram showing a procedure of communication between the detection apparatus 10, relay apparatus 20 and main apparatus 30. FIG. 21 is a flowchart showing an operation of the detection apparatus 10. FIG. 22 is a flowchart showing an operation of the relay apparatus 20. FIG. 23 is a flowchart showing an operation of the main apparatus.

The CPU 121 of the detection apparatus 10 retrieves the pressure and temperature data within tire detected by the pressure sensor 111 and temperature sensor 112 of the sensor section 11 (SG1), and wirelessly transmits the retrieved data to the relay apparatus 20 by use of electromagnetic wave of a first frequency f1 (SG2, S301 to S304). At this time, information having (1) a header indicating that the data is detection data and (2) specific identification information for each detection apparatus 10 each added to the detection data is transmitted as transmission information to the relay apparatus 20.

Then, it is determined whether or not the time count of a timer becomes T1 (SG3). If so, the timer is reset (SG4), and the flow proceeds to the above process SG1. According to the embodiment, the time T1 is set to about 3 to 5 minutes but is not limited thereto; T1 may be appropriately set. Also, the timing of information transmission from each detection apparatus 10 is at random. The time taken to perform one information transmission is several tens of milliseconds.

The CPU 221 of the relay apparatus 20 monitors whether or not the detection data is received from the detection apparatus 10 (SH1). When the detection data is received, the CPU 221 stores the received data (SH2, S301 to S304). Then, the CPU 221 monitors whether or not an information request signal is received from the main apparatus 30 (SH3). When the information request signal is received (S305, S307, S309, S311), the CPU 221 retrieves the atmospheric pressure and temperature data outside tire detected by the pressure sensor 211 and temperature sensor 212 of the sensor section 21 (SH4), and wirelessly transmits the retrieved data and the detection data received from the detection apparatus 10 to the main apparatus 30 by use of electromagnetic wave of a second frequency f2 (SH5, S306, S308, S310, S312). In transmitting the information, information having (1) a header indicating that the data is detection data and (2) specific identification information for each relay apparatus 20 each added to the above data is transmitted as transmission information to the main apparatus 30. Then, the flow proceeds to the above process SH1.

The CPU 331 of the main apparatus 30 sequentially transmits an information request signal to each relay apparatus 20 (SI1, S305, S307, S309, S311), and determines whether or not the reply signal, i.e., the detection data is received from all the relay apparatuses 20 (SI2). When it is determined that each detection data is received from all the relay apparatuses 20 (S306, S308, S310, 312), the identification information of the relay apparatus 20 is extracted from the received data (SI3), and at the same time the detection data from the sensor section 11 of the detection apparatus 10 and the detection data from the sensor section 21 of the relay apparatus 20 are extracted from the received data (SI4).

Then, the CPU 331 of the main apparatus 30 performs the data correction processing similar to the above described one (SI5). Based on the corrected data, the display section 34 displays the information (SI6).

Then, the CPU 331 starts the timer count (SI7), and it is determined whether or not the time count becomes T2 (SI8). If so, the flow proceeds to the above process SI1. According to the present embodiment, the time T2 is set to about 3 to 5 minutes.

Embodiment 4

Figure 24:
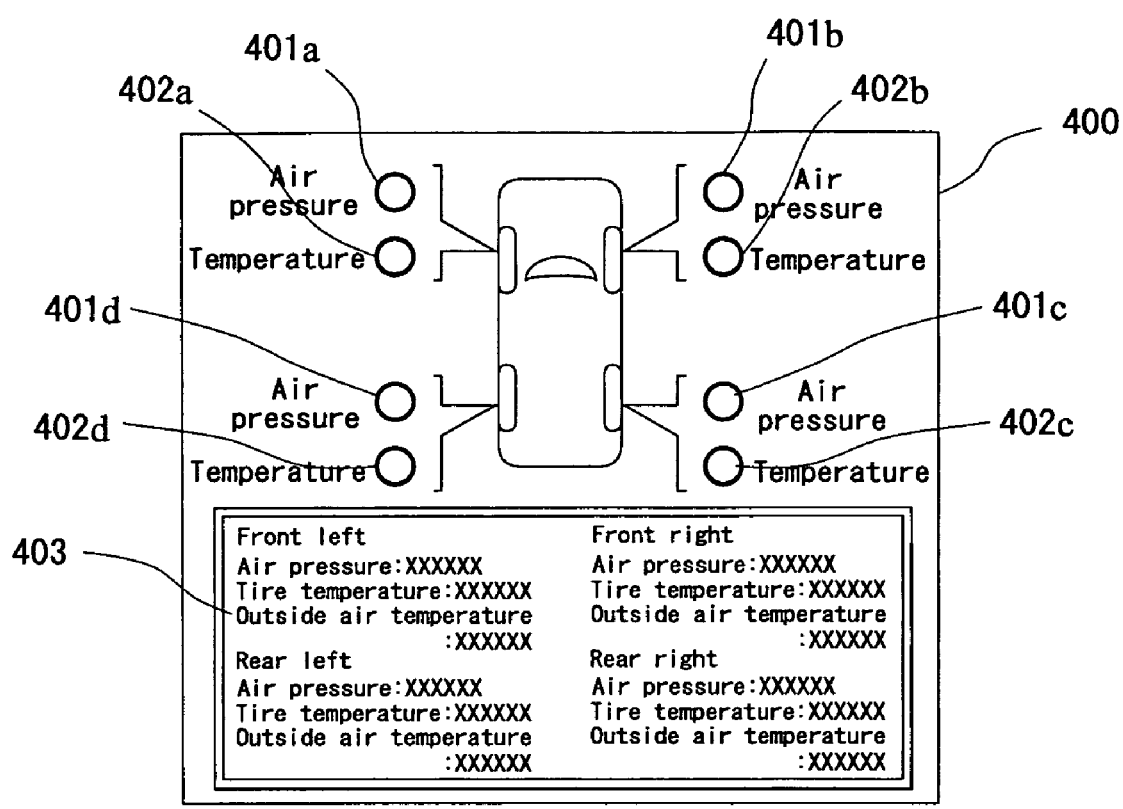
FIG. 24 is a diagram showing a display panel of a main apparatus according to an embodiment 4 of the present invention.

According to an embodiment 4, as shown in FIG. 24, outside air temperature for each wheel 2 is displayed on the liquid crystal display unit 403 of the display panel 400. By displaying, in this way, the outside air temperature in the vicinity of each wheel detected by the temperature sensor 212 of the relay apparatus 20, the outside air temperature in the vicinity of each wheel and the temperature of each tire can be visually recognized with ease, whereby the display of LEDs 402a to 402d can be easily understood. The displaying of outside air temperature in the vicinity of each wheel on the liquid crystal display unit 403 may also be applied to any one of the above described embodiments.

Embodiment 5

Figure 25:
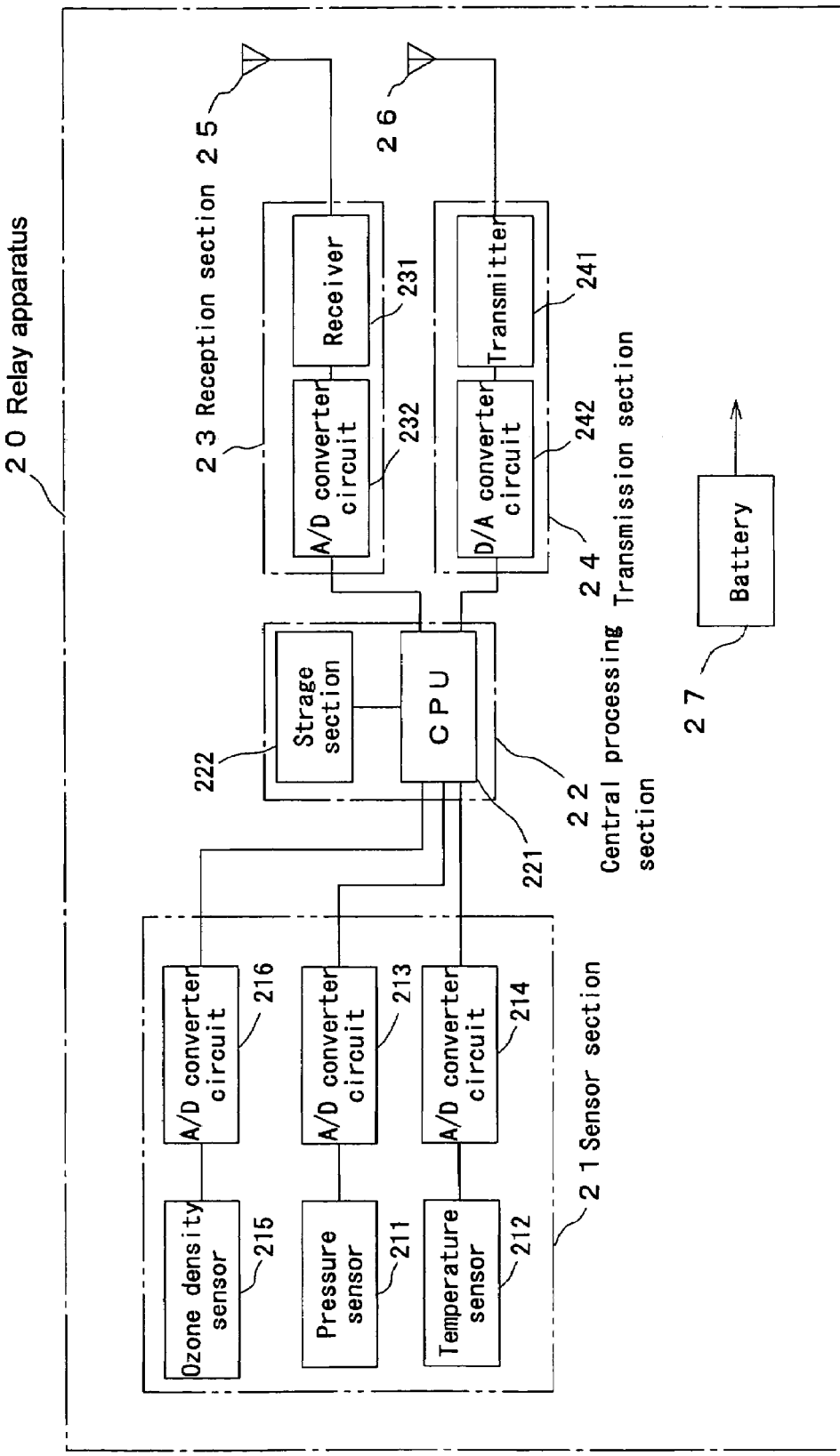
FIG. 25 is a block diagram showing an electrical circuit of a relay apparatus according to an embodiment 5 of the present invention.

FIG. 25 is a block diagram showing an electrical circuit of a relay apparatus according to an embodiment 5 of the present invention. Electrical circuits of the detection apparatus 10 and main apparatus 30 are similar to those of the above described embodiment 3.

In these drawings, the same reference numerals are applied to parts corresponding to the embodiment 3, and an explanation thereof is omitted. The difference between the embodiment 5 and the above described embodiment 3 is that: an ozone density sensor 215 is provided in the relay apparatus 20; and the degradation state of tire is displayed on the liquid crystal display unit 403 of the main apparatus 30 based on the detected ozone density.

Specifically, the sensor section 21 of the relay apparatus 20 includes the pressure sensor 211 to detect an atmospheric pressure outside tire in a vicinity of tire, the temperature sensor 212 to detect a temperature outside tire in a vicinity of tire, the ozone density sensor 215 to detect an ozone density outside tire in a vicinity of tire, and A/D converter circuits 213, 214, 216.

The ozone density sensor 215 detects an ozone density outside tire in a vicinity of tire, and outputs an analog electrical signal corresponding to the detected ozone density to the A/b converter circuit 216.

The A/D converter circuit 216 converts the value of the analog electrical signal received from the ozone density sensor 215 into a digital value and outputs the digital value to the CPU 221.

Also, a computer program stored in the storage section 222 of the relay apparatus 20 is different from that of the embodiment 3. With this program, the CPU 221 transmits to the main apparatus 30 the detection data received from the detection apparatus 10 and the detection data of each one of the pressure sensor 211, temperature sensor 212 and ozone density sensor 215 when the information request signal having the self identification information specified therein is received from the main apparatus 30.

Figure 26:
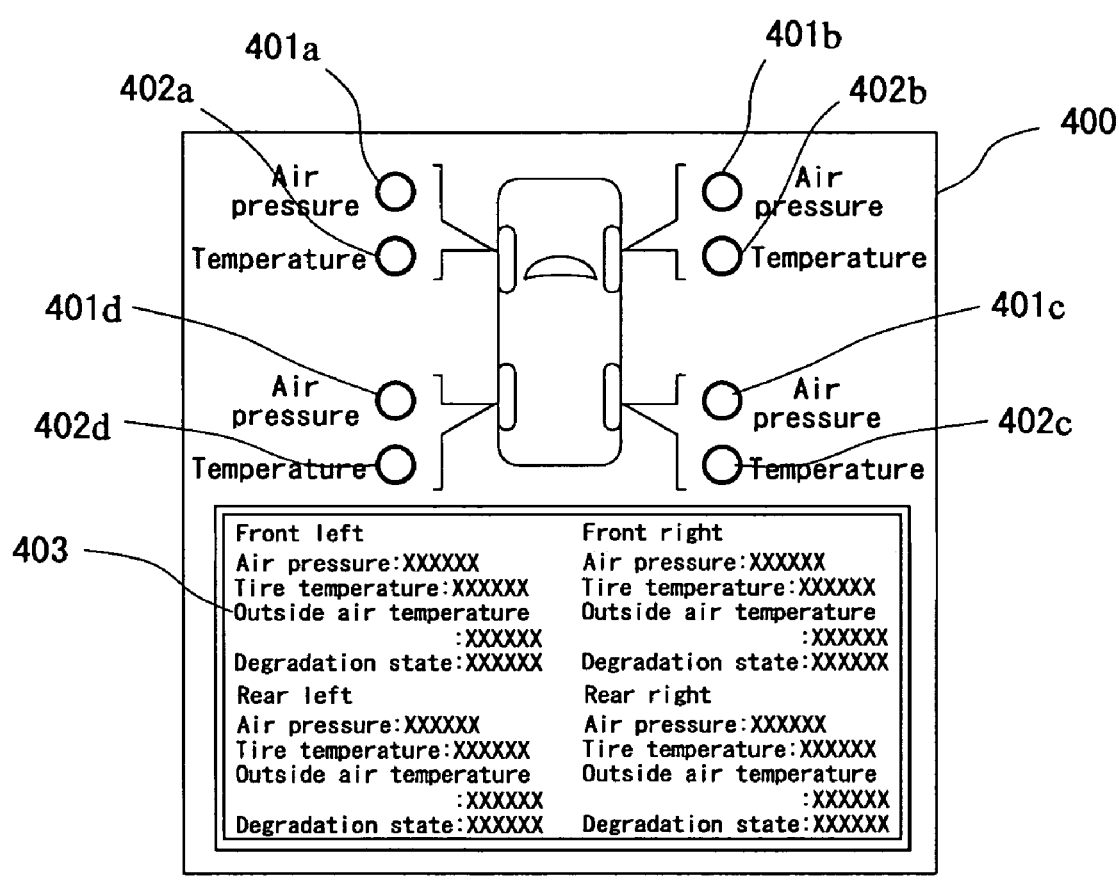
FIG. 26 is a diagram showing a display panel of a main apparatus according to the embodiment 5 of the present invention.

A computer program stored in the storage section 332 of the main apparatus 30 is different from that of the embodiment 3. With this program, the CPU 331 transmits the information request signal to each relay apparatus 20 at a predetermined interval to acquire information from each relay apparatus 20, whereby as shown in FIG. 26, the degradation state of tire estimated from the ozone density as well as the above described information are displayed on the liquid crystal display unit 403.

Figure 27:
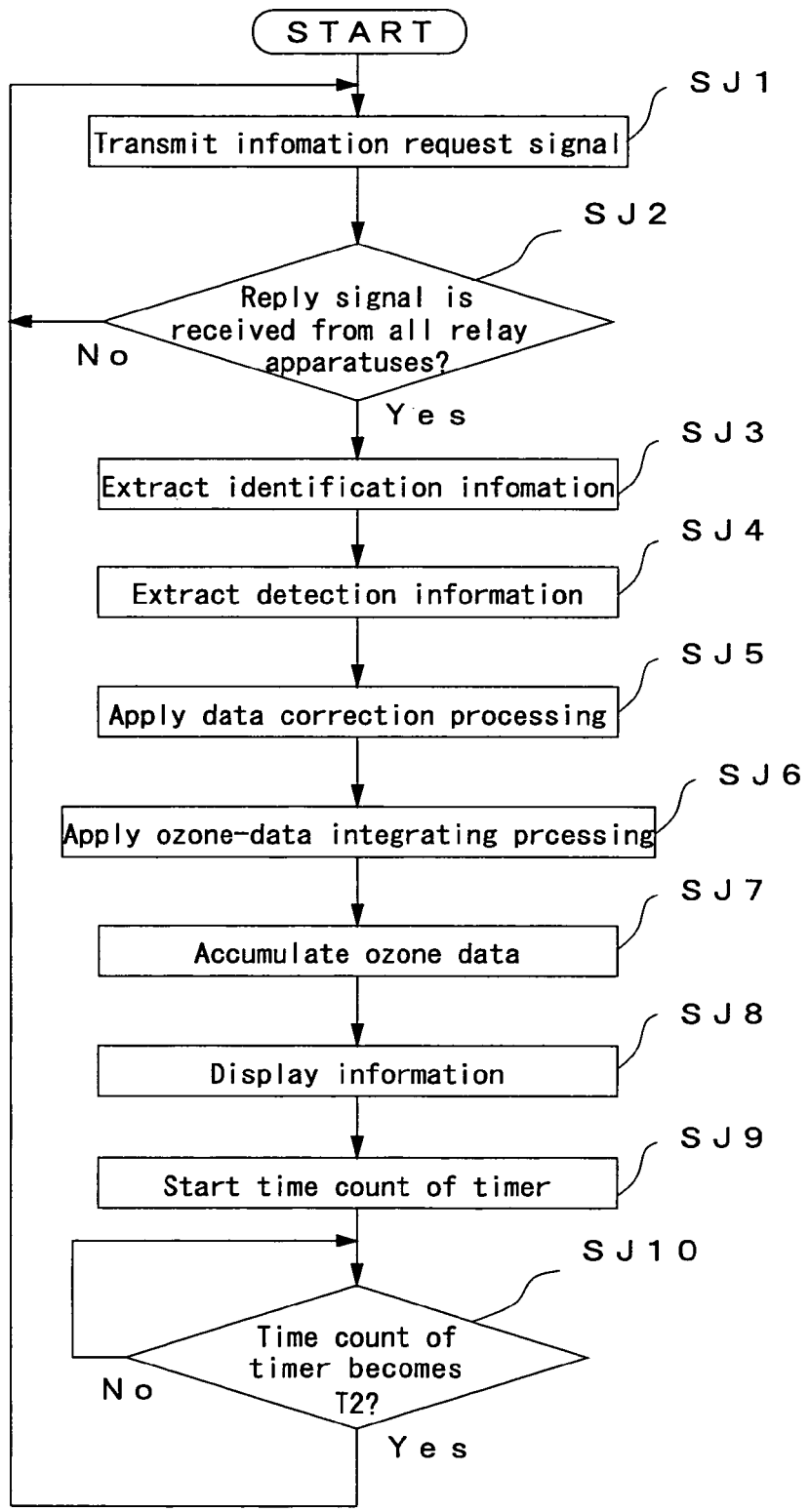
FIG. 27 is a flowchart showing an operation of the main apparatus according to the embodiment 5 of the present invention.

Specifically, as shown in the flowchart of FIG. 27, the CPU 331 of the main apparatus 30 sequentially transmits an information request signal to each relay apparatus 20 (SJ1), and determines whether or not the reply signal, i.e., the detection data is received from all the relay apparatuses 20 (SJ2). When it is determined that the detection data is received from all the relay apparatuses 20, the identification information of the relay apparatus 20 is extracted from the received data (SJ3), and at the same time the detection data from the sensor section 11 of the detection apparatus 10 and the detection data from the sensor section 21 of the relay apparatus 20 are extracted from the received data (SJ4).

Then, the CPU 331 of the main apparatus 30 performs the data correction processing similar to the above described one (SJ5). Also, the CPU 331 applies an integral processing to the detected ozone density data (SJ6), adds the resultant data to the integral-processing applied ozone density data which have been accumulated, and stores the accumulated data into the memory section 332 (SJ7). Then, the information based on the corrected data and stored ozone density data is displayed in the display section 34 (SJ8).

Regarding the ozone density in a vicinity of tire, the CPU 331 applies the integral processing to the detection data, and at the same time stores the data, and estimates the degree of degradation of the tire's surface, especially of the side wall section, based on the accumulated data to display the degree in the liquid crystal display unit 403. Accordingly, the tire's damage can be shown to the driver.

Then, the CPU 331 starts the timer count (SJ9), and determines whether or not the time count becomes T2 (SJ10). If so, the flow proceeds to the above process SJ1.

Each one of the above described embodiments is an example of the present invention, and the present invention is not limited only to the structures of the above described embodiments. For example, according to the above described embodiments, the information obtained by correcting the information on air pressure and temperature of tire by use of atmospheric pressure and temperature outside tire is provided for the driver; however, any physical quantity regarding tire other than air pressure and temperature may be corrected for provision.

INDUSTRIAL APPLICABILITY OF THE INVENTION

It is possible to inform of the information obtained by correcting the detected first physical quantity such as air pressure within tire by use of the detected second physical quantity such as outside air pressure in a vicinity of tire. Accordingly, the present invention can be applied to a case in which accurate information on tire is indispensable.

The invention claimed is:

1. A tire condition information collection apparatus for detecting a predetermined physical characteristics of a vehicle tire to inform a driver or an administrator of information on a tire condition, the tire condition information collection apparatus comprising: a plurality of detection apparatuses mounted on each tire; a plurality of relay apparatuses disposed in a predetermined vehicle side position in a vicinity of each tire; and a main apparatus for informing the driver or administrator of a result of detection of the physical characteristics of the tire, the tire condition information collection apparatus characterized in that the detection apparatus includes: a sensor circuit which detects a predetermined first physical characteristic within the tire to output an electrical signal corresponding to the first physical characteristic; and wireless communication means for wirelessly transmitting the result of detection as information within the tire by use of an electromagnetic wave of a first frequency based on the electrical signal outputted from the sensor circuit, and the relay apparatus includes: reception means for receiving the information within the tire transmitted from the wireless communication means of the detection apparatus; outside-tire information detection means for detecting a predetermined second physical characteristic outside the tire in a vicinity of the self apparatus as information outside the tire; transmission means for wirelessly transmitting the information within the tire and the information outside the tire by use of an electromagnetic wave of a second frequency; means for holding specific identification information for each relay apparatus; and means for transmitting the identification information of the relay apparatus along with the information within the tire and the information outside the tire, and a main apparatus includes: reception means for receiving the information within the tire and the information outside the tire transmitted from the relay apparatus; information correction means for correcting the first physical characteristic based on the information within the tire by use of the second physical characteristic based on the information outside the tire according to the received information within the tire and information outside the tire; and information informing means for informing of the information corrected by the information correction means as information on the tire condition.

2. The tire condition information collection apparatus according to claim 1, characterized in that:
the information within the tire transmitted by the detection apparatus contains at least information on air pressure value within the tire;
the information correction means has means for correcting the air pressure value within the tire by use of the information outside the tire; and
the information informing means has means for informing of the corrected air pressure value Within the tire.

3. The tire condition information collection apparatus according to claim 2, characterized in that:
the information outside the tire contains an outside air pressure value in the vicinity of the relay apparatus; and
the information correction means has means for correcting the air pressure value within the tire by use of the outside air pressure value.

4. The tire condition information collection apparatus according to claim 2, characterized in that:
the information outside tire contains an outside air temperature value in the vicinity of the relay apparatus; and
the information correction means has means for correcting the air pressure value within the tire by use of the outside air temperature value.

5. The tire condition information collection apparatus according to claim 1, characterized in that the detection apparatus includes: means for holding specific identification information for each detection apparatus; and means for transmitting the identification information of detection apparatus along with the information within the tire.

6. The tire condition information collection apparatus according to claim 1, characterized in that the relay apparatus includes: means for receiving an information request signal transmitted from the main apparatus; and means for transmitting the information within the tire and the information outside fire when the information request signal is received.

7. A tire condition information collection apparatus for detecting predetermined physical characteristics of a vehicle tire to inform a driver or an administrator of information on a tire condition, the tire condition information collection apparatus comprising: a plurality of detection apparatuses mounted on each tire; a plurality of relay apparatuses disposed in a predetermined vehicle side position in a vicinity of each tire; and a main apparatus for informing the driver or administrator of a result of detection of the physical characteristics of the tire, the tire condition information collection apparatus characterized in that the detection apparatus includes: a sensor circuit which detects a predetermined first physical characteristic within the tire to output an electrical signal corresponding to the first physical characteristic; and wireless communication means for wirelessly transmitting the result of detection as information within the tire by use of an electromagnetic wave of a first frequency based on the electrical signal outputted from the sensor circuit, and the relay apparatus includes: reception means for receiving the information within the tire transmitted from the wireless communication means of the detection apparatus; outside-tire information detection means for detecting a predetermined second physical characteristic outside the tire in a vicinity of the self apparatus as information outside the tire; transmission means for wirelessly transmitting the information within the tire and the information outside the tire by use of an electromagnetic wave of a second frequency, storage means for storing specific identification information for each relay apparatus; means for receiving the information request signal transmitted from the main apparatus; and means for transmitting the identification information, the information within the tire and the information outside the tire when the received information request signal contains the self identification information, and a main apparatus includes: reception means for receiving the information within the tire and the information outside the tire transmitted from the relay apparatus; information correction means for correcting the first physical characteristic based on the information within the tire by use of the second physical characteristic based on the information outside the tire according to the received information within the tire and information outside the tire; and information informing means for informing of the information corrected by the information correction means as information on the tire condition.

8. A tire condition information collection apparatus for detecting a predetermined physical characteristics of a vehicle tire to inform a driver or an administrator of information on a tire condition, the tire condition information collection apparatus comprising: a plurality of detection apparatuses mounted on each tire; a plurality of relay apparatuses disposed in a predetermined vehicle side position in a vicinity of each tire; and a main apparatus for informing the driver or administrator of a result of detection of the physical characteristics of the tire, the tire condition information collection apparatus characterized in that the detection apparatus includes: a sensor circuit which detects a predetermined first physical characteristic within the tire to output an electrical signal corresponding to the first physical characteristic; and wireless communication means for wirelessly transmitting the result of detection as information within the tire by use of an electromagnetic wave of a first frequency based on the electrical signal outputted from the sensor circuit, and the relay apparatus includes: reception means for receiving the information within the tire transmitted from the wireless communication means of the detection apparatus; outside-tire information detection means for detecting a predetermined second physical characteristic outside the tire in a vicinity of the self apparatus as information outside the tire; and transmission means for wirelessly transmitting the information within the tire and the information outside the tire by use of an electromagnetic wave of a second frequency, wherein the outside-tire information detection means of the relay apparatus has means for detecting an ozone density in the vicinity of the tire as a third physical characteristic, and the transmission means of the relay apparatus has means for transmitting the third physical characteristic as part of the information outside the tire;

and the main apparatus includes: reception means for receiving the information within the tire and the information outside the tire transmitted from the relay apparatus; information correction means for correcting the first physical characteristic based on the information within the tire by use of the second physical characteristic based on the information outside the tire according to the received information within the tire and information outside the tire; information informing means for informing of the information corrected by the information correction means as information on the tire condition; means for estimating a degradation state of the tire based on the information on ozone density received from the relay apparatus; and means for informing of the estimated degradation state of the tire.

9. The tire condition information collection apparatus according to claim 1, characterized in that the detection apparatus includes: means for detecting a temperature within the tire; and means for transmitting the detected information on temperature within the tire as part of the information within the tire, and the relay apparatus includes: means for detecting a temperature outside the tire; and means for transmitting the detected information on temperature outside the tire as part of the information outside the tire, and the main apparatus includes means for issuing a warning based on the received information on temperature within the tire and the received information on temperature outside the tire when the temperature value within the tire is larger than the temperature value outside the tire by a predetermined value or more.

10. A relay apparatus for use in a tire condition information collection apparatus including: a plurality of detection apparatuses mounted on each tire of vehicle, detecting predetermined physical characteristics of the fire and wirelessly transmitting the result of detection by use of an electromagnetic wave; a plurality of relay apparatuses disposed in a predetermined vehicle side position in a vicinity of each tire, wirelessly transmitting predetermined information containing the result of detection received from the detection apparatus by use of the electromagnetic wave of a predetermined frequency; and a main apparatus informing a driver or an administrator of the information on the tire condition, the relay apparatus characterized by comprising:

reception means for receiving the result of detection transmitted from the detection apparatus as information within the tire;

outside-tire information detection means for detecting predetermined physical characteristics outside the tire in a vicinity of tire as information outside the tire wherein said outside-tire information detection means has means for detecting as the physical characteristics an ozone density in the vicinity of the tire; and transmission means for wirelessly transmitting the information within the tire and the information outside the tire to the main apparatus by use of electromagnetic wave of the predetermined frequency.

11. The relay apparatus according to claim 10, characterized in that the outside-tire information detection means has means for detecting as the physical characteristics of at least one of an outside air temperature and an outside air pressure in the vicinity of the tire.

12. The relay apparatus according to claim 10, characterized by comprising:

means for receiving an information request signal transmitted from The main apparatus; and means for transmitting the information within the tire and the information outside the tire when the information request signal is received.

13. The relay apparatus according to claim 10, characterized by comprising:

storage means for storing specific identification information for each relay apparatus; and means for transmitting the identification information along with the information within the tire and the information outside the tire.

14. The relay apparatus according to claim 10, characterized by comprising:

storage means for storing specific identification information for each relay apparatus;

means for receiving an information request signal transmitted from the main apparatus; and means for transmitting the identification information, the information within the tire and the information outside the tire when The received information request signal contains the self identification information.

15. A relay apparatus for relaying a tire condition information, comprising:

an ID storage configured to store an ID unique to the relay apparatus, which is wirelessly transmittable;

a receiver configured to wirelessly receive first information indicative of conditions inside a tire installed in a motor vehicle;

a detector configured to detect second information indicative of conditions outside the tire; and a transmitter configured to wirelessly transmit the first information and the second information, and the ID.

16. The relay apparatus according to claim 15, wherein the first information comprises a pressure and a temperature of the tire, and the second information comprises an ambient pressure and temperature in the vicinity of the tire.

17. A tire condition information collection system comprising:
  at least one relay apparatus of claim 15; and
  a main controller configured to wirelessly receive the first information, the second information, and the ID from the relay apparatus, to adjust the first information based on the second information, and to send the adjusted first information to a display panel.

18. The tire condition information collection system according to claim 17, wherein at least One relay apparatus comprises multiple relay apparatuses each being assigned to a different tire.

* * * * *